(12) United States Patent
Mizoguchi et al.

(10) Patent No.: US 9,195,068 B2
(45) Date of Patent: Nov. 24, 2015

(54) OPTICAL SCANNER MANUFACTURING METHOD, OPTICAL SCANNER, IMAGE DISPLAY DEVICE, AND HEAD-MOUNTED DISPLAY

(71) Applicant: Seiko Epson Corporation, Tokyo (JP)

(72) Inventors: Yasushi Mizoguchi, Suwa (JP); Hisako Kojima, Chino (JP)

(73) Assignee: Seiko Epson Corporation (JP)

( * ) Notice: Subject to any disclaimer, the term of this patent is extended or adjusted under 35 U.S.C. 154(b) by 56 days.

(21) Appl. No.: 14/221,325

(22) Filed: Mar. 21, 2014

(65) Prior Publication Data

US 2014/0285864 A1 Sep. 25, 2014

(30) Foreign Application Priority Data

Mar. 25, 2013 (JP) ................................. 2013-062318

(51) Int. Cl.
*G02B 26/08* (2006.01)
*G02B 27/01* (2006.01)
*G02B 26/10* (2006.01)

(52) U.S. Cl.
CPC .......... *G02B 27/0176* (2013.01); *G02B 26/101* (2013.01); *G02B 26/105* (2013.01); *G02B 27/0149* (2013.01); *Y10T 156/1052* (2015.01)

(58) Field of Classification Search
CPC .... G02B 26/101; G02B 26/105; G02B 27/01; G02B 27/0176; G02B 26/10; G02B 27/0149; G02B 27/017

USPC ......... 359/197.1–199.4, 200.6–200.8, 202.1, 359/212.1–214.1, 221.2, 221.3, 359/223.1–224.1, 225.1–226.2, 900
See application file for complete search history.

(56) References Cited

U.S. PATENT DOCUMENTS

| | | | |
|---|---|---|---|
| 5,488,862 A | 2/1996 | Neukermans et al. | |
| 2014/0218780 A1 | 8/2014 | Mizoguchi | |

FOREIGN PATENT DOCUMENTS

| | | |
|---|---|---|
| JP | 3483567 B2 | 1/2004 |
| JP | 2009-216938 A | 9/2009 |
| JP | 2012-093431 A | 5/2012 |
| JP | 2014-153387 A | 8/2014 |

*Primary Examiner* — James Phan
(74) *Attorney, Agent, or Firm* — Harness, Dickey & Pierce, P.L.C.

(57) ABSTRACT

An optical scanner manufacturing method includes overlapping a first substrate including a base portion region that becomes a base portion, a shaft portion region that becomes a shaft portion, and a support portion region that becomes a support portion, and a second substrate in which a frame-like concave portion, a first portion that is positioned inside the concave portion, and a frame-like second portion that is positioned outside the concave portion and has a light reflectance reduction function are formed on one surface, to bond the base portion region to the first portion and to bond the support portion region to the second portion, patterning the first substrate to form the base portion, the shaft portion, and the support portion, and cutting the second substrate from the other surface side to separate the first portion and the second portion from each other.

12 Claims, 16 Drawing Sheets

OPTICAL SCANNER MANUFACTURING METHOD, OPTICAL SCANNER, IMAGE DISPLAY DEVICE, AND HEAD-MOUNTED DISPLAY

BACKGROUND

1. Technical Field

The present invention relates to an optical scanner manufacturing method, an optical scanner, an image display device, and a head-mounted display.

2. Related Art

For example, image display devices that display an image on a screen are known to be configured to have a light source and an optical scanner that scans light from the light source (for example, see JP-A-2009-216938). The image display device described in JP-A-2009-216938 has three laser light sources, a synthesis portion that synthesizes the laser light from the three laser light sources, and an optical scanner that scans the laser light synthesized by the synthesis portion.

The optical scanner has a base having a support portion that is of a frame shape, a movable plate that is provided inside the support portion and has a light reflection portion, and a pair of connecting portions that connects the support portion and the movable plate, and a light blocking member that is provided to cover the substrate. The light blocking member is provided with an entrance window portion for incidence of the laser light onto the light reflection portion and an emission window portion for emission of the laser light reflected on the light reflection portion. In JP-A-2009-216938, by providing the light blocking member, laser light scanning in the optical scanner is allowed and the generation of stray light is reduced.

However, in the optical scanner described in JP-A-2009-216938, the base (particularly, the movable plate) and the light blocking member are configured as separate members, and thus there is concern that the alignment of the base and the light blocking member deviates. When the alignment deviates, a part of laser light cannot pass through the entrance window portion or the emission window portion, or the stray light prevention effect is reduced.

SUMMARY

An advantage of some aspects of the invention is that it provides an optical scanner manufacturing method adapted to form an optical scanner capable of reducing stray light with high accuracy, an optical scanner that is formed using the manufacturing method and can reduce stray light, an image display device, and a head-mounted display.

An aspect of the invention is directed to an optical scanner manufacturing method including overlapping a first substrate including a base portion region that becomes a base portion, a shaft portion region that becomes a shaft portion swingably supporting the base portion, and a support portion region that becomes a support portion supporting the base portion via the shaft portion, and a second substrate in which a frame-like concave portion, a first portion that is positioned inside the concave portion, and a frame-like second portion that is positioned outside the concave portion and has a light reflectance reduction function are formed on one surface, to bond the base portion region to the first portion and to bond the support portion region to the second portion, patterning the first substrate to form the base portion, the shaft portion, and the support portion, and cutting the second substrate from the other surface side to allow the concave portion to penetrate the other surface side to thus separate the first portion and the second portion from each other.

With this configuration, it is possible to form an optical scanner capable of reducing stray light with high accuracy.

In the optical scanner manufacturing method of the aspect of the invention, it is preferable that the optical scanner manufacturing method further includes forming a light reflection portion having reflectivity on a surface of the first portion on the opposite side to the first substrate after the cutting of the second substrate.

With this configuration, it is possible to efficiently reflect received light using the light reflection portion.

In the optical scanner manufacturing method of the aspect of the invention, it is preferable that the optical scanner manufacturing method further includes filling a gap between the first substrate and the second substrate with a seal material before the cutting of the second substrate, and in the cutting of the second substrate, the second substrate is cut through wet etching.

With this configuration, it is possible to protect the first substrate from an etching liquid.

In the optical scanner manufacturing method of the aspect of the invention, it is preferable that a surface of the second portion is provided with a light reflection reduction portion that reduces light reflectance.

With this configuration, it is possible to easily impart a light reflection reduction function to the second portion.

In the optical scanner manufacturing method of the aspect of the invention, it is preferable that an inner surface of the concave portion is made concave to include a curved surface.

With this configuration, the first portion and the second portion separated from each other have no side surface perpendicular to the main surface, and thus it is possible to more effectively reduce the generation of stray light.

In the optical scanner manufacturing method of the aspect of the invention, it is preferable that in the overlapping of the first substrate and the second substrate, the first substrate and the second substrate are bonded to each other through anodic bonding.

With this configuration, the first substrate and the second substrate can be bonded to each other relatively easily with a high strength.

Another aspect of the invention is directed to an optical scanner including a substrate that has a base portion, a shaft portion swingably supporting the base portion, and a support portion supporting the base portion via the shaft portion, a spacer that is supported by the base portion, a fixed portion that is fixed to the support portion, is provided around at least a part of an outer periphery of the spacer, and is made from the same material as the spacer, and a light reflection reduction portion that is provided on a surface of the fixed portion on the substrate side and reduces light reflectance.

With this configuration, an optical scanner capable of reducing stray light is obtained.

In the optical scanner of the aspect of the invention, it is preferable that the optical scanner further includes a light-reflective light reflection portion that is provided on a surface of the spacer on the opposite side to the substrate.

With this configuration, it is possible to efficiently reflect received light using the light reflection portion.

In the optical scanner of the aspect of the invention, it is preferable that a surface of the spacer and a surface of the fixed portion on the opposite side to the substrate are positioned flush with each other.

With this configuration, it is possible to more effectively reduce the generation of stray light without disturbing light scanning by the light reflection portion.

In the optical scanner of the aspect of the invention, it is preferable that the fixed portion overlaps at least a part of the shaft portion in plan view of the substrate, and a torsion detection element that detects torsion of the shaft portion is provided in the region where the shaft portion and the fixed portion overlap each other.

With this configuration, the incidence of light onto the detection element is prevented or reduced, and thus the detection element can detect the torsion with higher accuracy.

Still another aspect of the invention is directed to an image display device including a substrate that has a base portion, a shaft portion swingably supporting the base portion, and a support portion supporting the base portion via the shaft portion, a spacer that is supported by the base portion and has a light reflection portion that reflects light, a fixed portion that is fixed to the support portion, is provided around at least a part of an outer periphery of the spacer, and is made from the same material as the spacer, and a light reflection reduction portion that is provided on a surface of the fixed portion on the substrate side and reduces light reflectance.

With this configuration, an image display device capable of reducing stray light and exhibiting excellent display characteristics is obtained.

Yet another aspect of the invention is directed to a head-mounted display including a frame that is mounted on an observer's head, and an optical scanner that is provided in the frame, in which the optical scanner includes a substrate that has a base portion, a shaft portion swingably supporting the base portion, and a support portion supporting the base portion via the shaft portion; a spacer that is supported by the base portion and has a light reflection portion that reflects light; a fixed portion that is fixed to the support portion, is provided around at least a part of an outer periphery of the spacer, and is made from the same material as the spacer; and a light reflection reduction portion that is provided on a surface of the fixed portion on the substrate side and reduces light reflectance.

With this configuration, a head-mounted display capable of reducing stray light and exhibiting excellent display characteristics is obtained.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, preferred embodiments of an optical scanner manufacturing method, an optical scanner, an image display device, and a head-mounted display will be described with reference to the accompanying drawings.

1. Image Display Device

First Embodiment

First, a first embodiment of an image display device of the invention will be described.

Figure 1:
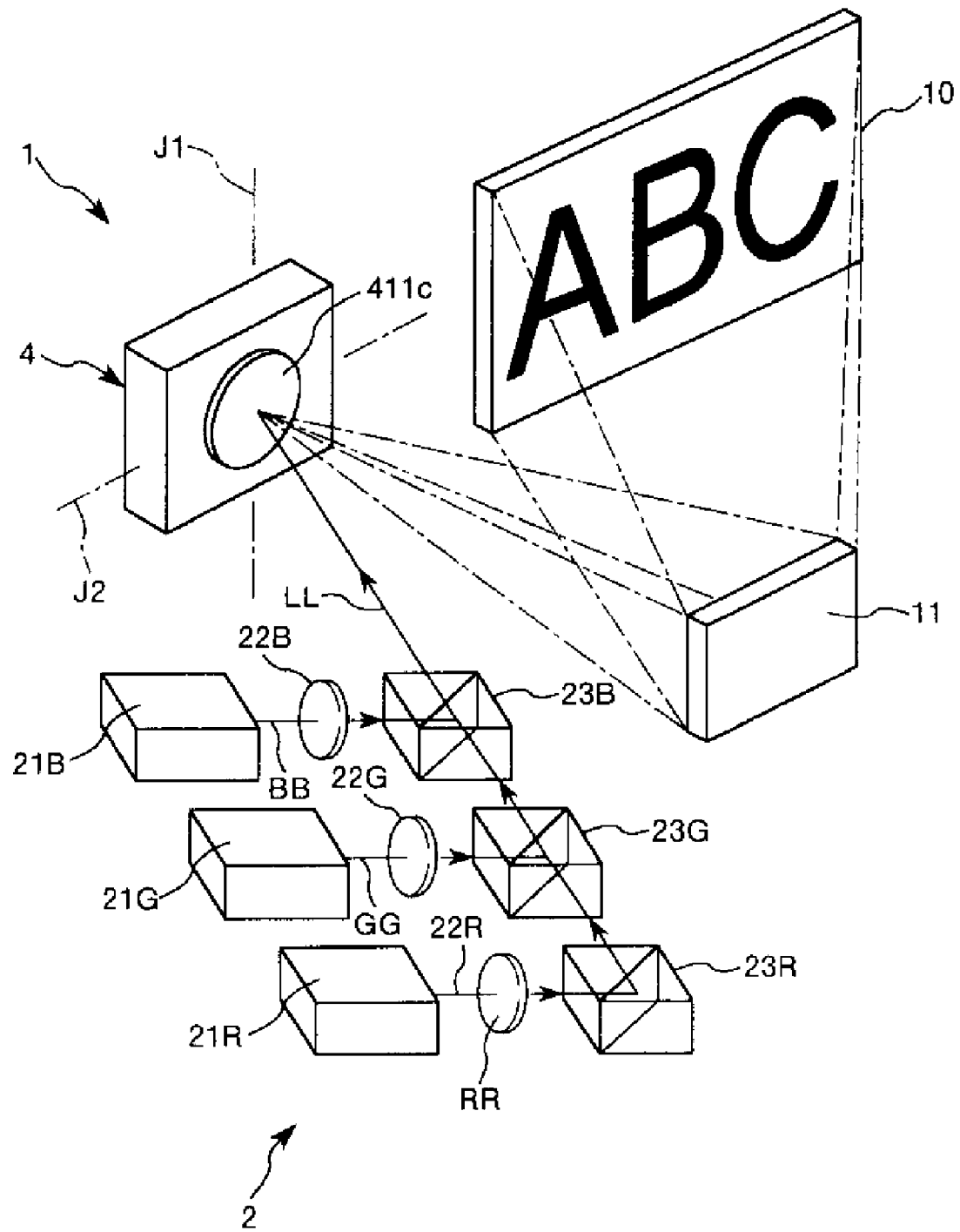
FIG. 1 is a diagram showing a configuration according to a first embodiment of an image display device of the invention.
Figure 2:
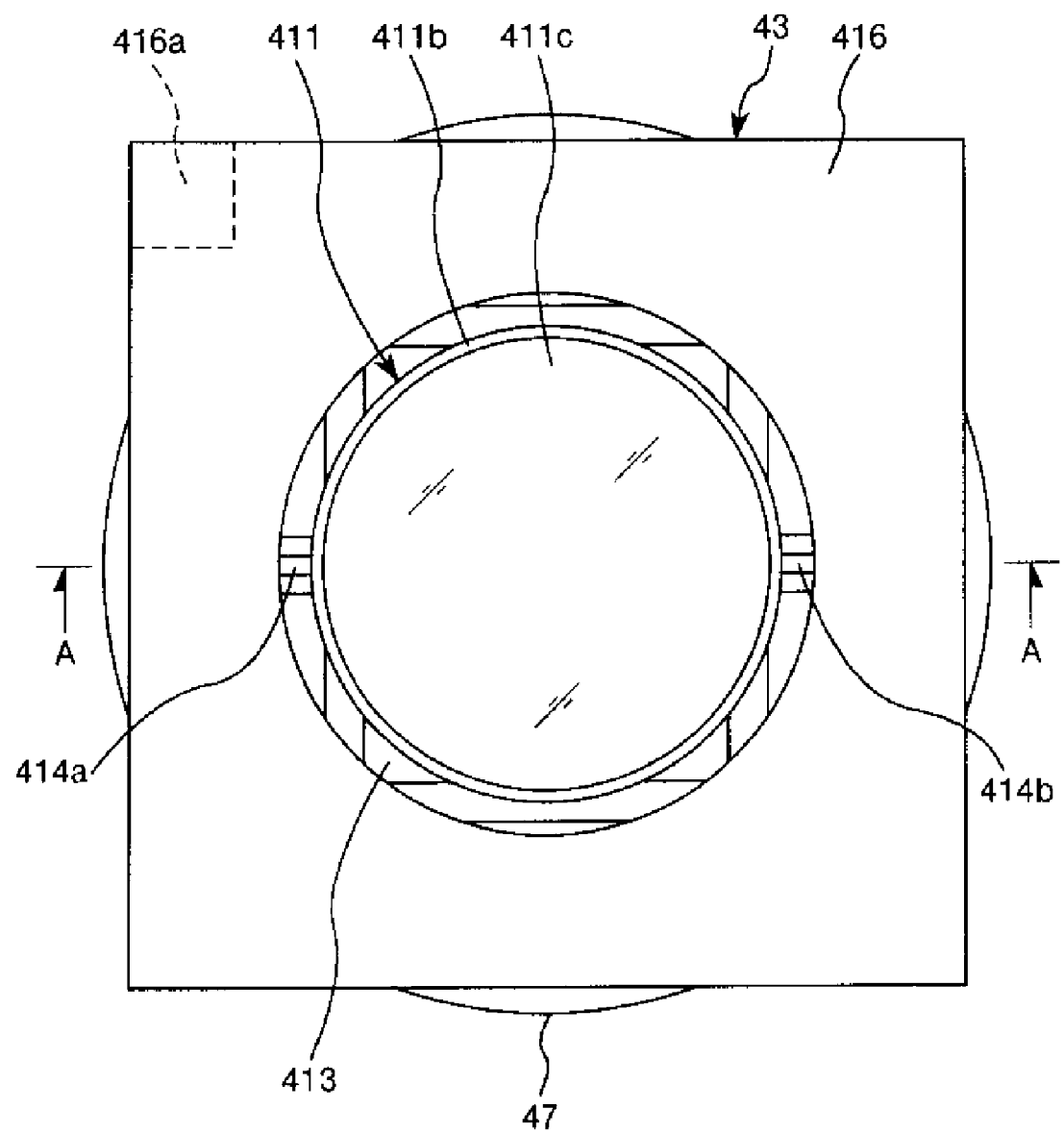
FIG. 2 is a top view of an optical scanner of the image display device shown in FIG. 1.
Figure 3:
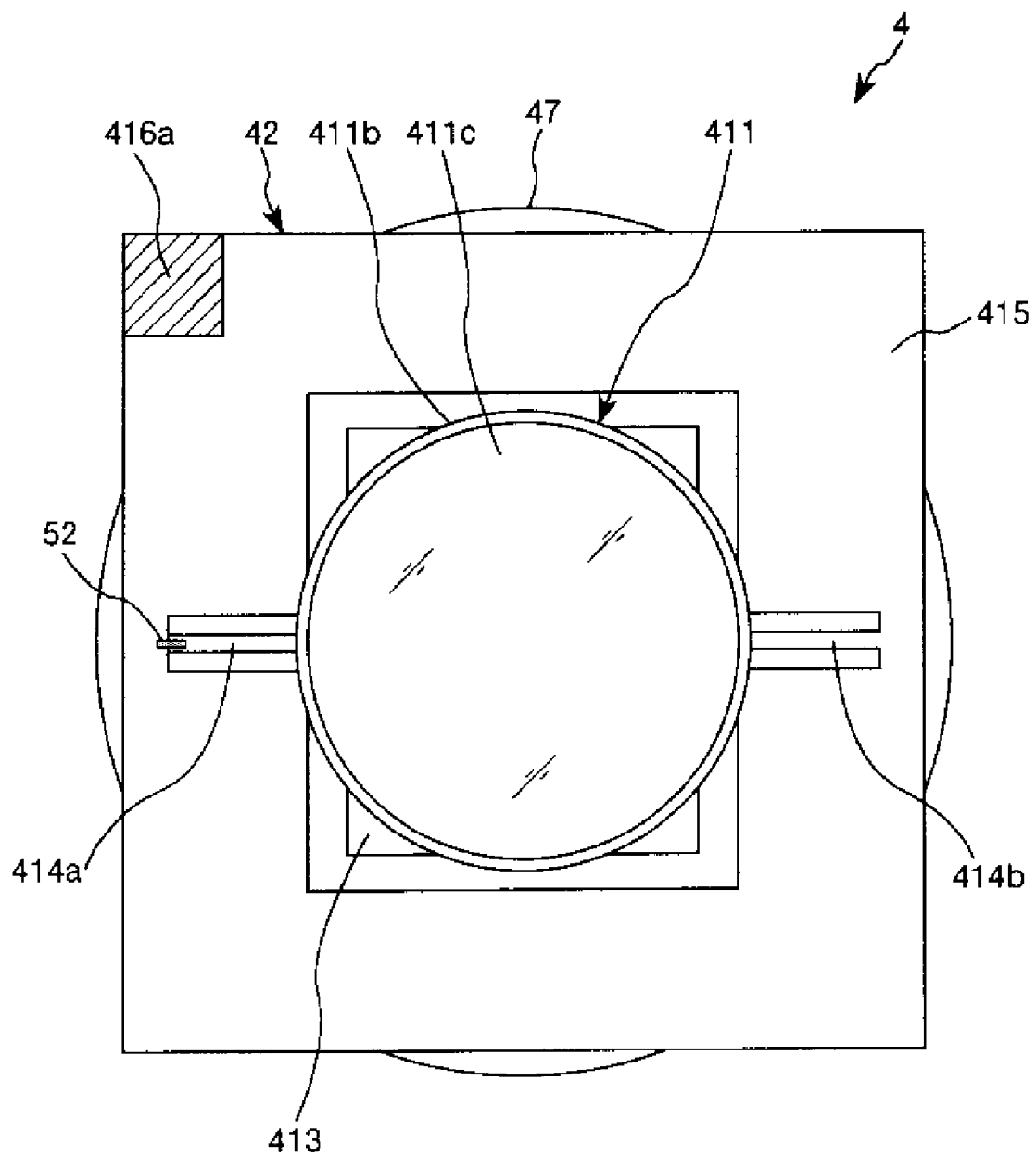
FIG. 3 is a top view in which a fixed portion is omitted from the optical scanner shown in FIG. 2.
Figure 4:
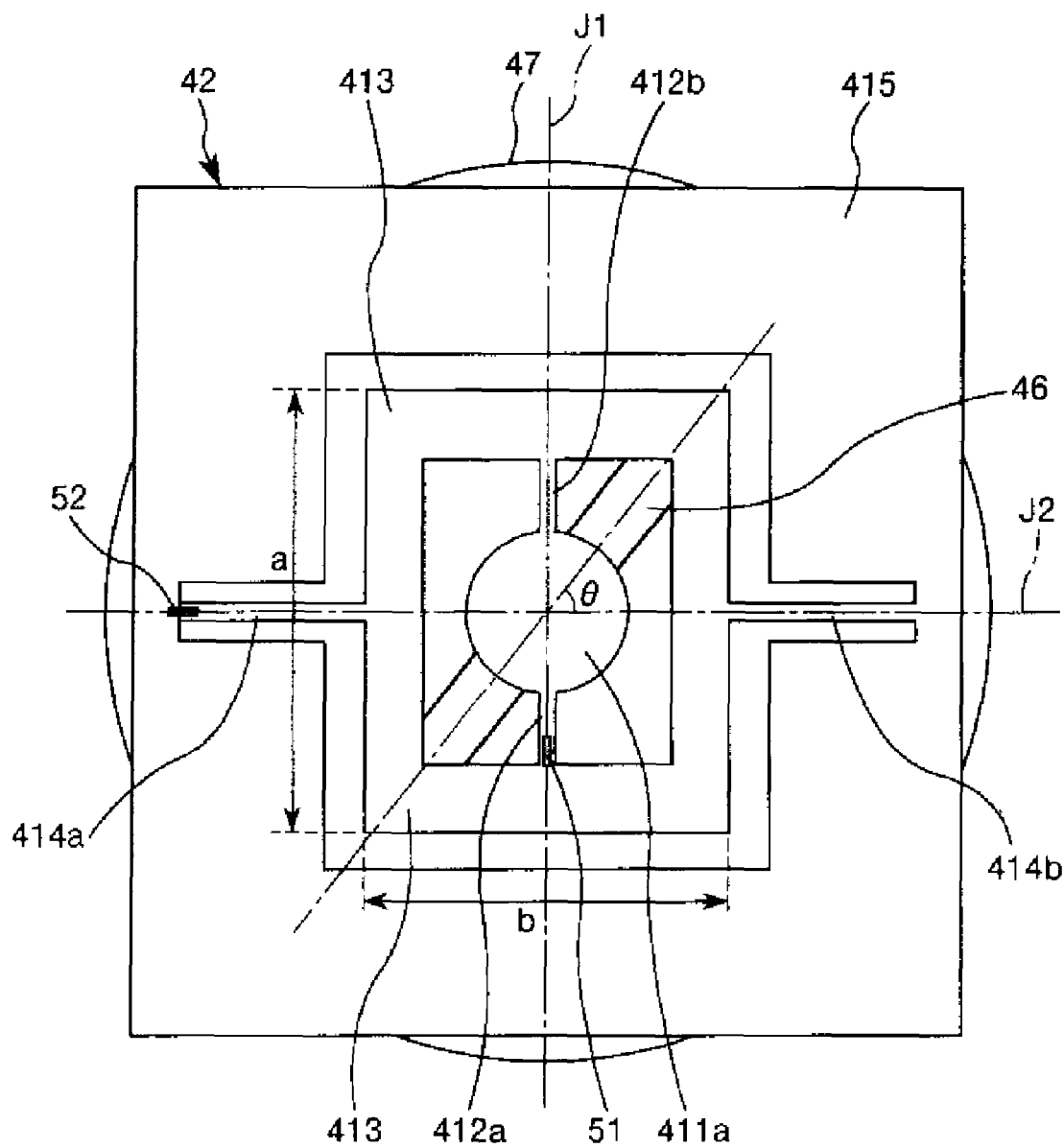
FIG. 4 is a top view in which a spacer is omitted from the optical scanner shown in FIG. 3.
Figure 5:
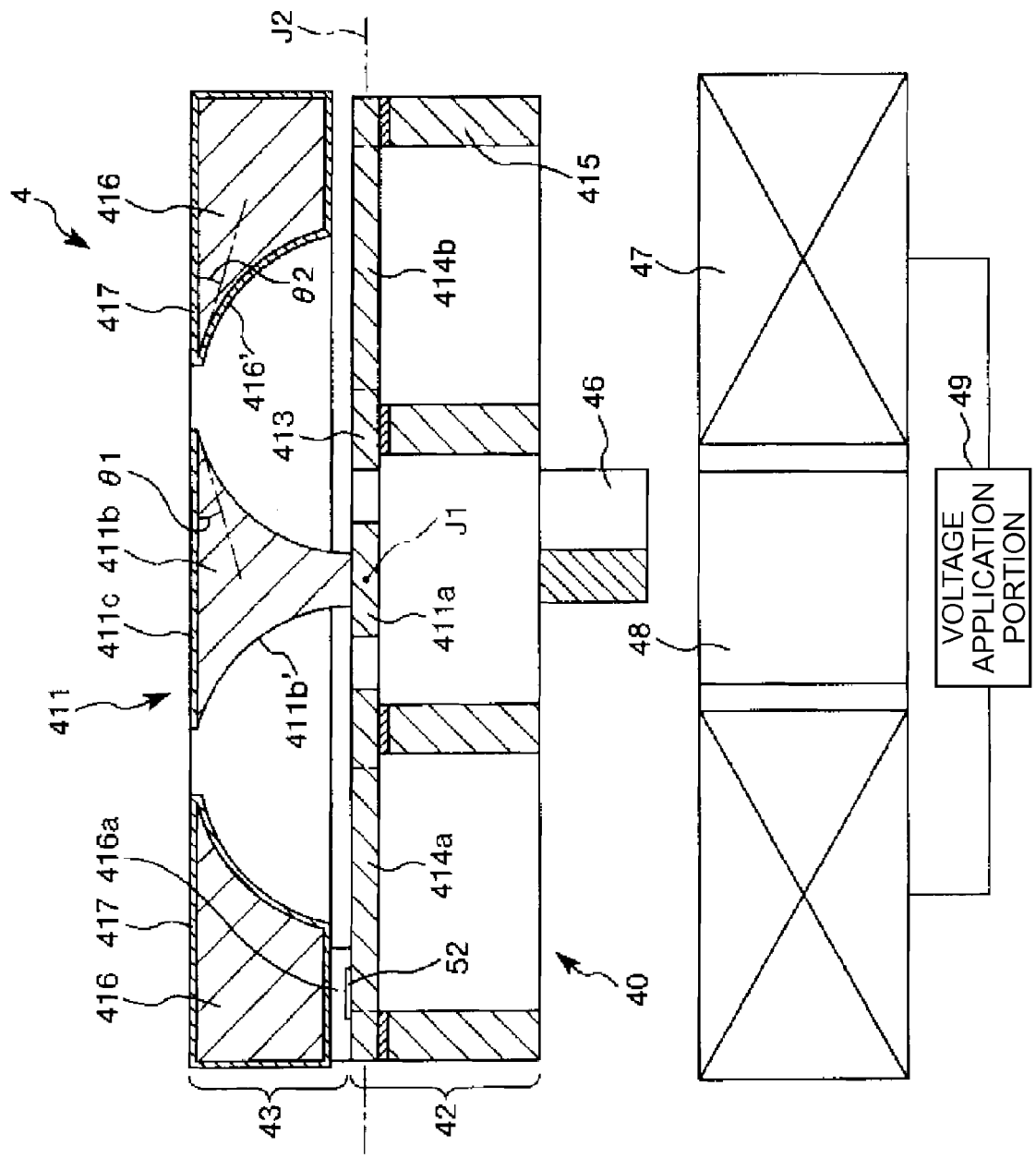
FIG. 5 is a cross-sectional view taken along the line A-A of FIG. 2.
Figure 6:
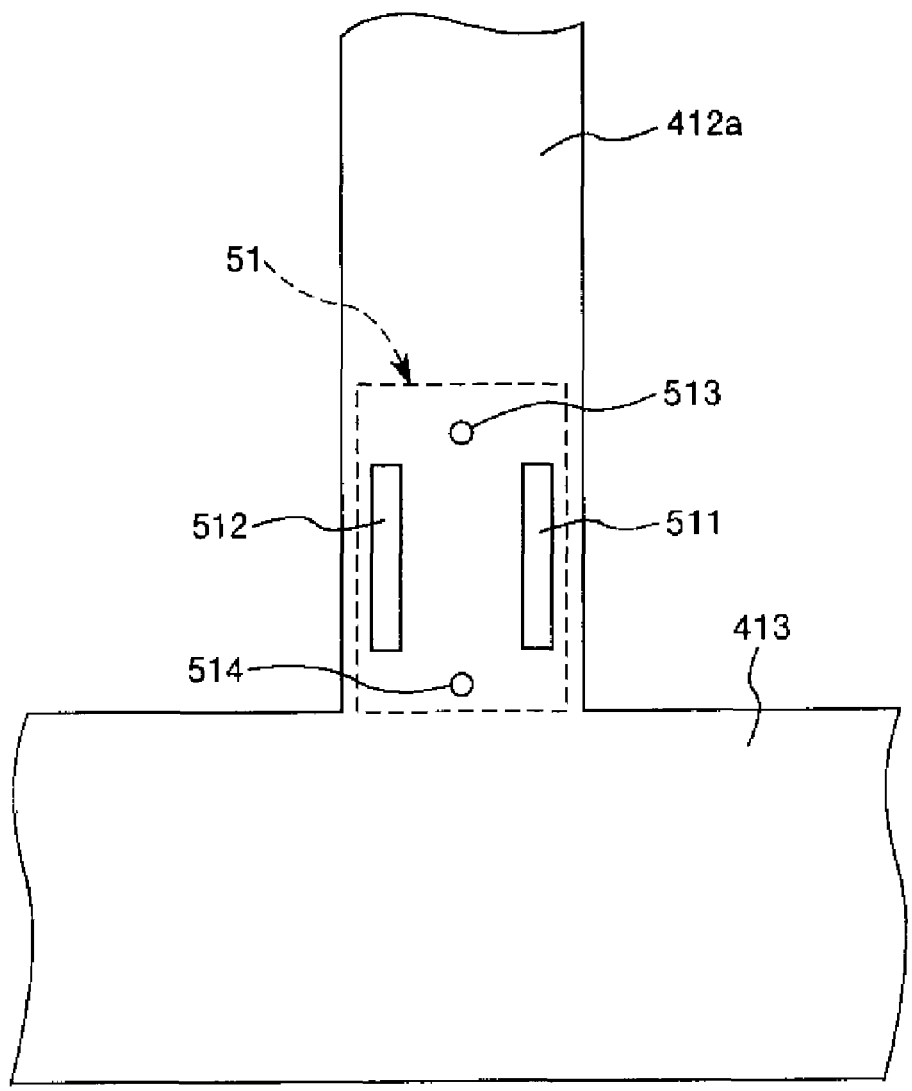
FIG. 6 is a plan view showing a detection element of the optical scanner shown in FIG. 4.
Figure 7:
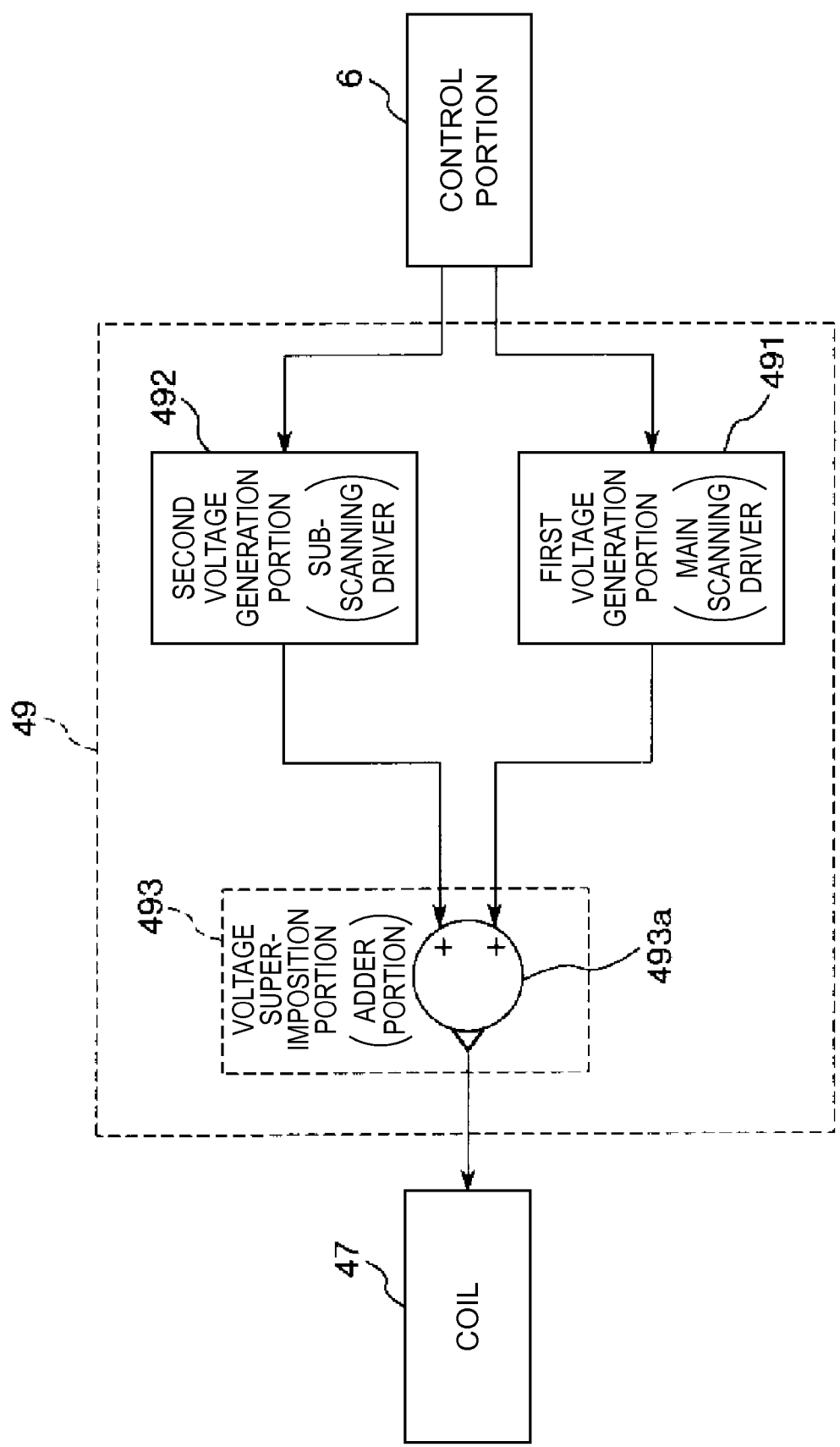
FIG. 7 is a block diagram of a voltage application unit of the optical scanner shown in FIG. 5.
Figure 8A:
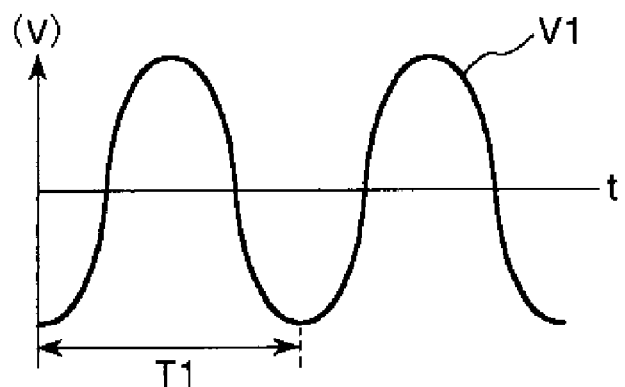
FIGS. 8A and 8B are diagrams showing examples of voltages generated by the first voltage generation portion and the second voltage generation portion shown in FIG. 7.
Figure 8B:
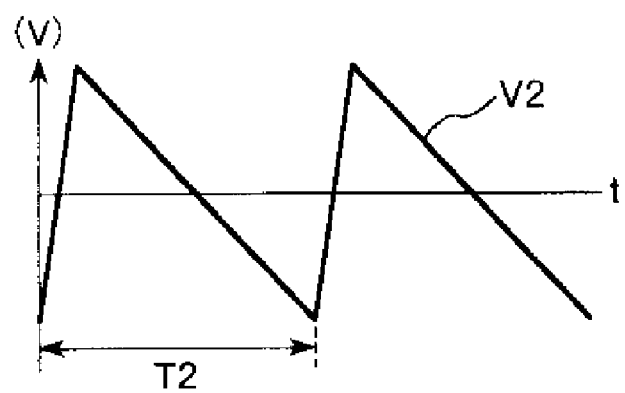

FIG. 1 is a diagram showing a configuration according to a first embodiment of an image display device of the invention. FIG. 2 is a top view of an optical scanner of the image display device shown in FIG. 1. FIG. 3 is a top view in which a fixed portion is omitted from the optical scanner shown in FIG. 2. FIG. 4 is a top view in which a spacer is omitted from the optical scanner shown in FIG. 3. FIG. 5 is a cross-sectional view taken along the line A-A of FIG. 2. FIG. 6 is a plan view showing a detection element of the optical scanner shown in FIG. 4. FIG. 7 is a block diagram of a voltage application unit of the optical scanner shown in FIG. 5. FIGS. 8A and 8B are diagrams showing examples of voltages generated by the first voltage generation portion and the second voltage generation portion shown in FIG. 7. Hereinafter, for the sake of convenience of description, the front side in FIGS. 2 to 4 and the upper side in FIG. 5 will be referred to as "upper" and the deep side in FIGS. 2 to 4 and the lower side in FIG. 5 will be referred to as "lower".

An image display device 1 shown in FIG. 1 is a device that displays an image on a target object 10 such as a screen or a wall surface by two-dimensionally scanning drawing laser light LL.

As shown in FIGS. 1, 4, and 7, the image display device 1 has a drawing light source unit 2 that emits drawing laser light LL, an optical scanner 4 that scans the drawing laser light LL, a mirror 11 that reflects the drawing laser light LL scanned by the optical scanner 4, and a control portion 6 that controls actuation of the drawing light source unit 2 and the optical scanner 4. The mirror 11 may be provided if necessary, or be omitted.

Drawing Light Source Unit

As shown in FIG. 1, the drawing light source unit 2 is provided with laser light sources (light source portions) 21R, 21G, and 21B of different colors of red, green, and blue, and collimator lenses 22R, 22G, and 22B and dichroic mirrors 23R, 23G, and 23B that are provided corresponding to the laser light sources 21R, 21G, and 21B, respectively.

Each of the laser light sources 21R, 21G, and 21B has a light source and a drive circuit (not shown). The laser light source 21R emits red laser light RR, the laser light source 21G emits green laser light GG, and the laser light source 21B emits blue laser light BB. The laser light beams RR, GG, BB are emitted in response to a drive signal that is transmitted from the control portion 6, and become parallel light or approximately parallel light by the collimator lenses 22R, 22G, and 22B. For example, semiconductor lasers such as an edge-emitting semiconductor laser and a surface-emitting semiconductor laser can be used as the laser light sources 21R, 21G, and 21B. Using the semiconductor lasers, the laser light sources 21R, 21G, and 21B can be reduced in size.

The dichroic mirrors 23R, 23G, and 23B are disposed according to the arrangement of the laser light sources 21R, 21G, and 21B. The dichroic mirror 23R is characterized so that the laser light RR is reflected thereon. The dichroic mirror 23B is characterized so that the laser light BB is reflected thereon and the laser light RR is transmitted therethrough. The dichroic mirror 23G is characterized so that the laser light GG is reflected thereon and the laser light beams RR and BB are transmitted therethrough. By virtue of the dichroic mirrors 23R, 23G, and 23B, the laser light beams RR, GG, and BB of different colors are synthesized and become the drawing laser light LL.

Optical Scanner

The optical scanner 4 has a function of two-dimensionally scanning the drawing laser light LL from the drawing light source unit 2. As shown in FIGS. 2 to 6, the optical scanner 4 is provided with a structural body 40, a permanent magnet 46, a coil 47, a core 48, and a voltage application portion 49. In addition, the structural body 40 has a movable portion 411, a pair of first shaft portions 412a and 412b, a frame body portion 413, a pair of second shaft portions 414a and 414b, a support portion 415, and a fixed portion 416.

Among these, the movable portion 411 and the first shaft portions 412a and 412b configure a first vibration system that is swung (rotated in a reciprocating manner) around a first axis J1 with the first shaft portions 412a and 412b as axes. In addition, the movable portion 411, the first shaft portions 412a and 412b, the frame body portion 413, the second shaft portions 414a and 414b, and the permanent magnet 46 configure a second vibration system that is swung (rotated in a reciprocating manner) around a second axis J2. In addition, the permanent magnet 46, the coil 47, the core 48, and the voltage application portion 49 configure a drive unit that drives the above-described first and second vibration systems.

The movable portion 411 has a base portion 411a, a spacer 411b that is provided on an upper surface of the base portion 411a, and a light-reflective light reflection portion 411c that is provided over nearly the entire area of an upper surface of the spacer 411b. Drawing laser light LL is incident onto the movable portion 411, and the incident drawing laser light LL is reflected on a surface of the light reflection portion 411c and is scanned in a direction corresponding to a posture of the light reflection portion 411c. The light reflection portion 411c can be formed by, for example, forming a metal material such as aluminum into a film on the upper surface of the spacer 411b.

The spacer 411b separates the first shaft portions 412a and 412b from each other in a thickness direction and is provided to overlap the entire area of the first shaft portions 412a and 412b in plan view of the structural body 40 as shown in FIGS. 2 and 3. Therefore, it is possible to increase the area (the area of the light reflection portion 411c) of the upper surface of the spacer 411b while reducing the distance between the first shaft portions 412a and 412b. In addition, since the distance between the first shaft portions 412a and 412b can be reduced, the frame body portion 413 can be reduced in size. Furthermore, since the frame body portion 413 can be reduced in size, the distance between the second shaft portions 414a and 414b can be reduced. Accordingly, the optical scanner 4 can be reduced in size even when the area of the plate surface of the light reflection portion 411c is increased.

Although will be described in detail later, as shown in FIG. 4, a detection element 51 is provided at a base end portion of the first shaft portion 412a to detect a torsion amount (a swing angle of the movable portion 411) of the first shaft portion 412a. Therefore, it can be said that the spacer 411b is provided so that the incidence of drawing laser light LL onto the detection element 51 is blocked by the light reflection portion 411c. As will be described later, since light has an effect on an output signal of the detection element 51, an accurate output signal can be obtained from the detection element 51 by blocking the drawing laser light LL with the light reflection portion 411c.

In addition, as shown in FIG. 5, the spacer 411b has an approximately circular truncated cone shape, and a surface corresponding to a top bottom thereof is bonded to the base portion 411a. When the spacer 411b has such a configuration, it is possible to reduce the base portion 411a that supports the spacer 411b while securing a large upper surface of the spacer 411b (the area where the light reflection portion 411c is formed). Therefore, it is possible to reduce the optical scanner 4 in size while maintaining excellent optical scanning characteristics.

As shown in FIG. 5, a side surface 411b' of the spacer 411b is configured to include a curved concave surface curved inside compared with the circular truncated cone. By virtue of the configuration, it is possible to reduce an angle θ1 that is formed between the upper surface and the side surface of the spacer 411b. Accordingly, the drawing laser light LL that is applied from above is difficult to irradiate the side surface (in the vicinity of the upper surface) of the spacer 411b, and thus unnecessary light reflection that causes stray light can be reduced. θ1 is not particularly limited. It is preferably about 5° to 40°, and more preferably about 20° to 30°. Accordingly, it is possible to more effectively exhibit the above-described effects while sufficiently securing the strength of the upper surface edge portion of the spacer 411b.

The frame body portion 413 has a frame shape and is provided around the base portion 411a of the movable portion 411. In other words, the base portion 411a of the movable portion 411 is provided inside the frame body portion 413 that is of a frame shape. The base portion 411a of the movable portion 411 is supported by the frame body portion 413 via the pair of first shaft portions 412a and 412b.

As shown in FIG. 4, the frame body portion 413 is provided so that a length in a direction along the first axis J1 is longer than a length in a direction along the second axis J2. That is, when the length of the frame body portion 413 in the direction along the first axis J1 is denoted by a and the length of the frame body portion 413 in the direction along the second axis J2 is denoted by b, the relationship of a>b is satisfied. Accordingly, it is possible to reduce the length of the optical scanner 4 in the direction along the second axis J2 while securing the length necessary for the first shaft portions 412a and 412b.

The support portion 415 has a frame shape and is provided around the frame body portion 413. In other words, the frame body portion 413 is provided inside the support portion 415 that is of a frame shape. The frame body portion 413 is supported by the support portion 415 via the pair of second shaft portions 414a and 414b.

In addition, each of the first shaft portions 412a and 412b and the second shaft portions 414a and 414b is configured to be elastically deformable. The first shaft portions 412a and 412b connect the movable portion 411 and the frame body portion 413 so that the movable portion 411 is swingable around the first axis J1. The second shaft portions 414a and 414b connect the frame body portion 413 and the support portion 415 so that the frame body portion 413 is swingable around the second axis J2 perpendicular to the first axis J1.

The first shaft portions 412a and 412b are disposed to be opposed to each other via the base portion 411a of the movable portion 411. In addition, each of the first shaft portions 412a and 412b has a longitudinal shape extending in the direction along the first axis J1. Each of the first shaft portions 412a and 412b is connected to the base portion 411a at one end portion and is connected to the frame body portion 413 at the other end portion. In addition, each of the first shaft portions 412a and 412b is disposed so that the central axis thereof corresponds to the first axis J1. Each of the first shaft portions 412a and 412b is torsionally deformed along with the swings of the movable portion 411 around the first axis J1.

The second shaft portions 414a and 414b are disposed to be opposed to each other via the frame body portion 413. In addition, each of the second shaft portions 414a and 414b has a longitudinal shape extending in the direction along the second axis J2. Each of the second shaft portions 414a and 414b is connected to the frame body portion 413 at one end portion and is connected to the support portion 415 at the other end portion. In addition, each of the second shaft portions 414a and 414b is disposed so that the central axis thereof corresponds to the second axis J2. The second shaft portions 414a and 414b are torsionally deformed along with the swings of the frame body portion 413 around the second axis J2. The shapes of the first shaft portions 412a and 412b and the second shaft portions 414a and 414b are not limited to the above-described ones, and for example, these may have a bent or curved portion or a branched portion in at least one place therein. In addition, the first shaft portions 412a and 412b and the second shaft portions 414a and 414b may be divided into two shaft portions.

In the structural body 40, the movable portion 411 (the light reflection portion 411c) can be made swingable around two axes, i.e., the first and second axes J1 and J2 perpendicular to each other by making the movable portion 411 swingable around the first axis J1 and by making the frame body portion 413 swingable around the second axis J2.

In addition, the fixed portion 416 is provided on an upper surface of the support portion 415. The fixed portion 416 is disposed at the same height as the spacer 411b of the movable portion 411 and is provided around the spacer 411b when viewed from above. In other words, the spacer 411b is provided inside the fixed portion 416 that is of a frame shape.

The fixed portion 416 has a protruding portion 416a that protrudes from a lower surface and is bonded to the support portion 415 with the protruding portion 416a. Therefore, the lower surface of the fixed portion 416 is separated from the support portion 415 and the second shaft portions 414a and 414b in a thickness direction. Here, the protruding portion 416a may not be provided with a light blocking portion 417 to be described later depending on a method of bonding the protruding portion 416a to the support portion 415. Therefore, the protruding portion 416a is preferably designed to be as small as possible as long as the strength of the bonding to the support portion 415 can be secured, and is preferably disposed at a position that is separated as far as possible from the light reflection portion 411c. In addition, since stress may be caused in the bonded portion depending on the bonding method, the bonding area is preferably made as small as possible. The shape and the arrangement of the protruding portion 416a are not particularly limited, and for example, it may have a frame shape along the outer periphery of the fixed portion 416 and may be provided at each angular portion of the fixed portion 416.

The surface of the fixed portion 416 (a region other than the protruding portion 416a) is provided with the light blocking portion (a light reflection reduction portion) 417 having a light blocking function and a light reflectance reduction function. Accordingly, the fixed portion 416 can exhibit the light blocking function and the light reflectance reduction function. Therefore, the intrusion of drawing laser light LL into the structural body 40 via the fixed portion 416 can be suppressed, and the generation of stray light in the structural body 40 can be effectively reduced. In addition, stray light that is generated due to the reflection on the surface of the fixed portion 416 can be reduced. In addition, for example, it is possible to effectively absorb the light as stray light that intrudes into the structural body 40 from a gap between the spacer 411b and the fixed portion 416 and is reflected on the first shaft portions 412a and 412b, the frame body portion 413, the second shaft portions 414a and 414b, and the like. Therefore, the leakage of the stray light beyond the structural body 40 can be reduced and the incidence of the stray light onto the detection elements 51 and 52 to be described later can be reduced.

The nontransmittance of the light blocking portion 417 is preferably high. Specifically, the nontransmittance is preferably 70% or higher, and more preferably 90% or higher. The reflectance of the light blocking portion 417 is preferably small. Specifically, the reflectance is preferably 5% or lower, and more preferably 2% or lower.

The constituent material of the light blocking portion 417 is not particularly limited as long as it has a light blocking function and a light reflectance reduction function, and for example, chromium (Cr) can be used. The light blocking portion 417 having an excellent light blocking function and an excellent light reflectance reduction function is obtained using Cr. In this case, the surface of the light blocking portion 417 may be roughened. A configuration may also be employed in which an antireflection film (an AR coating) is laminated on a layer made from Cr.

The light blocking portion 417 is preferably provided over nearly the entire area of the fixed portion 416 as in this embodiment, but the invention is not limited thereto. For example, the light blocking portion 417 may be provided only on the upper or lower surface of the fixed portion 416. In addition, the light blocking portion 417 may not have a light blocking function as long as it has at least a light reflectance reduction function.

The fixed portion 416 is provided to overlap base end portions of the second shaft portions 414a and 414b in plan view of the structural body 40. Although will be described in detail later, a detection element 52 is provided at the base end portion of the second shaft portion 414a (a region overlapping the fixed portion 416) to detect a torsion amount (a swing angle of the frame body portion 413) of the second shaft portion 414a. That is, the fixed portion 416 is provided to block the incidence of drawing laser light LL onto the detection element 52. As will be described later, since light has an effect on an output signal of the detection element 52, an accurate output signal can be obtained from the detection element 52 by blocking the drawing laser light LL with the fixed portion 416.

In addition, as shown in FIG. 2, the inner periphery of the upper surface of the fixed portion 416 has a circular shape (a shape similar to) concentrical to the upper surface of the spacer 411b. Accordingly, since the inner periphery of the fixed portion 416 and the outer periphery of the spacer 411b can be disposed closer to each other, the gap between the fixed portion 416 and the spacer 411b is reduced. As a result, drawing laser light LL that intrudes into the structural body 40 via the gap is reduced, and thus the generation of stray light can be reduced and the stray light becomes difficult to leak beyond the structural body 40.

In addition, as shown in FIG. 5, an inner peripheral surface (an inner surface) 416' of the fixed portion 416 is provided to be inclined so that an angle θ2 formed with the fixed portion 416 becomes less than 90°. Accordingly, the fixed portion 416 can be disposed closer to the spacer 411b while the contact of the movable portion 411 is prevented. Therefore, the gap between the fixed portion 416 and the spacer 411b is reduced. As a result, drawing laser light LL that intrudes into the structural body 40 via the gap is reduced, and thus the generation of stray light can be reduced and the stray light becomes difficult to leak beyond the structural body 40. Particularly, in this embodiment, since the inner peripheral surface 416' of the fixed portion 416 is configured to include a curved concave surface recessed inside the fixed portion 416, θ2 can be reduced. θ2 is not particularly limited. It is preferably about 5° to 40°, and more preferably about 20° to 30°. Accordingly, it is possible to effectively exhibit the above-described effects while sufficiently securing the strength of the inner edge portion of the fixed portion 416.

In addition, the upper surface of the fixed portion 416 is positioned flush with the upper surface of the spacer 411b. Accordingly, it is possible to reduce the generation of stray light without disturbing the scanning of drawing laser light LL in the light reflection portion 411c.

Specifically, when the upper surface of the fixed portion 416 is positioned higher than the upper surface of the spacer 411b, the fixed portion 416 overlaps an optical path of drawing laser light LL and there is concern that the scanning of the drawing laser light LL may be disturbed. In addition, the gap between the fixed portion 416 and the spacer 411b is increased compared with that in this embodiment, by the amount corresponding to the vertical deviation between the upper surfaces of the fixed portion 416 and the spacer 411b. Therefore, the drawing laser light LL that intrudes into the structural body 40 from the gap increases and there is concern that the amount of generated stray light increases.

On the other hand, when the upper surface of the fixed portion 416 is positioned lower than the upper surface of the spacer 411b, it is necessary to arrange the inner periphery of the fixed portion 416 away from the spacer 411b compared with that in this embodiment in order to avoid the contact with the spacer 411b during swing, and by the amount corresponding to the increased distance from the spacer 411b, the gap between the fixed portion 416 and the spacer 411b is increased. In addition, by the amount corresponding to the vertical deviation between the upper surfaces of the fixed portion 416 and the spacer 411b, the gap between the fixed portion 416 and the spacer 411b is increased compared with that in this embodiment. Therefore, the drawing laser light LL that intrudes into the structural body 40 from the gap increases and there is concern that the amount of generated stray light increases.

In this manner, when the upper surface of the fixed portion 416 is disposed flush with the upper surface of the spacer 411b as in this embodiment, it is possible to reduce the generation of stray light without disturbing the scanning of drawing laser light LL in the light reflection portion 411c, compared with other cases.

The structural body 40 is configured as a laminate in which a first substrate 42 and a second substrate 43 are laminated.

The first substrate 42 is provided with the base portion 411a, the first shaft portions 412a and 412b, the frame body portion 413, the second shaft portions 414a and 414b, and the support portion 415 so that these are formed integrally with each other. In this embodiment, the first substrate 42 is a SOI substrate in which a first Si layer (a device layer), a SiO$_2$ layer (a box layer), and a second Si layer (a handle layer) are laminated in this order, and by etching the substrate, the base portion 411a, the first shaft portions 412a and 412b, the frame body portion 413, the second shaft portions 414a and 414b, and the support portion 415 are formed. Accordingly, it is possible to ensure excellent vibration characteristics of the first and second vibration systems. In addition, the SOI substrate can be subjected to fine processing through etching. Accordingly, the base portion 411a, the first shaft portions 412a and 412b, the frame body portion 413, the second shaft portions 414a and 414b, and the support portion 415 are formed using the SOI substrate, and thus excellent dimension accuracy thereof can be ensured and the optical scanner 4 can be reduced in size.

Each of the base portion 411a, the first shaft portions 412a and 412b, and the second shaft portions 414a and 414b is configured to include the first Si layer of the SOI substrate. Accordingly, it is possible to ensure excellent elasticity of the first shaft portions 412a and 412b and the second shaft portions 414a and 414b. In addition, it is possible to prevent the base portion 411a from being brought into contact with the frame body portion 413 when being rotated around the first axis J1. In addition, each of the frame body portion 413 and the support portion 415 is configured to include a laminate formed of the first Si layer, the SiO$_2$ layer, and the second Si layer of the SOI substrate. Accordingly, it is possible to ensure excellent stiffness of the frame body portion 413 and the support portion 415. In addition, the SiO$_2$ layer and the second Si layer of the frame body portion 413 function as ribs to increase the stiffness of the frame body portion 413 and also have a function of preventing the contact of the base portion 411a with the permanent magnet 46.

The second substrate 43 is provided with the spacer 411b and the fixed portion 416. In this embodiment, the second substrate 43 is formed of a glass substrate made from a glass material such as quartz glass, Tempax glass, and Pyrex glass ("Pyrex" is a registered trade name), and the spacer 411b and the fixed portion 416 are formed by etching the glass substrate. The glass substrate can be subjected to fine processing (particularly, curved surface processing) through etching. Accordingly, the spacer 411b and the fixed portion 416 are formed using the glass substrate, and thus the spacer 411b and the fixed portion 416 having a side surface configured to include a curved concave surface as in this embodiment can be easily formed.

The method of bonding the first substrate 42 to the second substrate 43, that is, the method of bonding the base portion 411a to the spacer 411b and bonding the support portion 415 to the fixed portion 416 is not particularly limited, and anodic bonding is preferably used. Accordingly, the first and second substrates 42 and 43 can be easily bonded to each other with a high strength. For this reason, as described above, the first substrate 42 is preferably formed using a SOI substrate and the second substrate 43 is preferably formed using a glass substrate.

As described above, the detection element 51 is provided at the base end portion of the first shaft portion 412a to detect torsion of the first shaft portion 412a, and the detection element 52 is provided at the base end portion of the second shaft portion 414a to detect a torsion amount of the second shaft portion 414a. Hereinafter, the detection elements 51 and 52 will be described. Since the detection elements 51 and 52 have the same configuration, the configuration of the detection element 51 will be described as a representative and the description of the configuration of the detection element 52 will be omitted.

As shown in FIG. 6, the detection element 51 is a piezoresistive element formed on a surface of the Si substrate, and has a pair of input terminals 511 and 512 provided to be opposed to each other in a width direction of the first shaft portion 412a and a pair of output terminals 513 and 514 provided to be opposed to each other in a longitudinal direction of the first shaft portion 412a. Although not shown in the drawing, the terminals 511 to 514 are led out up to the support portion 415 via the frame body portion 413 and the second shaft portion 414b by wiring.

When the first shaft portion 412a is torsionally deformed in a state in which a voltage is applied to the pair of input terminals 511 and 512, a voltage based on the direction and the size of the torsion is output from the pair of output terminals 513 and 514. Therefore, based on the output voltage, the swing angle of the movable portion 411 around the first axis J1 can be detected from the torsion state of the first shaft portion 412a. Similarly, the detection element 52 can also detect the swing angle of the movable portion 411 around the second axis J2 from the torsion state of the second shaft portion 414a.

The configuration of the detection element 51 is not limited to this embodiment, and for example, the positions of the input terminals 511 and 512 and the positions of the output terminals 513 and 514 may be reversed. That is, the input terminals 511 and 512 may be provided to be separated in the longitudinal direction of the first shaft portion 412a, and the output terminals 513 and 514 may be provided to be separated in the width direction of the first shaft portion 412a. In addition, the position where the detection element 51 is positioned may be in the vicinity of the based end portion of the first shaft portion 412a, on the first shaft portion 412a, on the frame body portion 413, or on the boundary therebetween.

As described above, the detection elements 51 and 52 have a problem in that when these receive light, noise (an unnecessary signal) enters the output signal, and thus the torsion states of the first and second shaft portions 412a and 414a cannot be detected with high accuracy. Therefore, in this embodiment, the light reflection portion 411c is disposed above the detection element 51 and the fixed portion 416 is disposed above the detection element 52 to reduce the incidence of drawing laser light LL to the detection elements 51 and 52 and to increase the accuracy of the output signal of the detection elements 51 and 52. As a result, the posture of the movable portion 411 can be more accurately detected.

As shown in FIG. 5, the permanent magnet 46 is bonded to a lower surface of the frame body portion 413. The method of bonding the permanent magnet 46 to the frame body portion 413 is not particularly limited, and for example, a bonding method using an adhesive can be used. The permanent magnet 46 is magnetized in a direction inclined with respect to the first and second axes J1 and J2 when viewed from above.

In this embodiment, the permanent magnet 46 has a longitudinal shape (a rod shape) extending in the direction inclined with respect to both the first and second axes J1 and J2. The permanent magnet 46 is magnetized in a longitudinal direction thereof. That is, the permanent magnet 46 is magnetized so that one end portion becomes an S pole and the other end portion becomes an N pole. In addition, the permanent magnet 46 is provided to be symmetric with respect to an intersection point of the first axis J1 and the second axis J2 as a center when viewed from above.

Although an inclination angle θ of the magnetization direction (the extending direction) of the permanent magnet 46 with respect to the second axis J2 is not particularly limited, it is preferably 30° to 60°, more preferably 45° to 60°, and even more preferably 45°. By providing the permanent magnet 46 as described above, the movable portion 411 (the light reflection portion 411c) can be swung around the second axis J2 smoothly and securely.

Preferable examples of the permanent magnet 46 include a neodymium magnet, a ferrite magnet, a samarium-cobalt magnet, an alnico magnet, and a bonded magnet. The permanent magnet 46 is provided by magnetizing a hard magnetic body. For example, it is formed by installing a hard magnetic body before magnetization in the frame body portion 413 and by then magnetizing the hard magnetic body. When the permanent magnet 46 already magnetized is installed in the frame body portion 413, the permanent magnet 46 may not be installed at a desired position due to the effects of an external magnetic field and magnetic fields of other components.

The coil 47 is provided just below the permanent magnet 46. Accordingly, it is possible to allow a magnetic field that is generated from the coil 47 to efficiently act on the permanent magnet 46. Accordingly, the power consumption and the size of the optical scanner 4 can be reduced. The coil 47 is provided to be wound around the core 48. Accordingly, it is possible to allow a magnetic field that is generated from the coil 47 to efficiently act on the permanent magnet 46. The core 48 may be omitted.

The coil 47 is electrically connected to the voltage application portion 49. The voltage application portion 49 applies a voltage to the coil 47, and thus a magnetic field having a magnetic flux perpendicular to the first and second axes J1 and J2 is generated from the coil 47.

As shown in FIG. 7, the voltage application portion 49 is provided with a first voltage generation portion 491 that generates a first voltage V1 for rotating the movable portion 411 around the first axis J1, a second voltage generation portion 492 that generates a second voltage V2 for rotating the movable portion 411 around the second axis J2, and a voltage superimposition portion 493 that superimposes the first voltage V1 and the second voltage V2, and applies voltages obtained by the superimposition of the voltage superimposition portion 493 to the coil 47.

The first voltage generation portion 491 generates a first voltage V1 (a voltage for main scanning) that changes periodically with a period T1, as shown in FIG. 8A. The first voltage V1 forms a sinusoidal waveform. A frequency (1/T1) of the first voltage V1 is preferably, for example, 10 kHz to 40 kHz. In this embodiment, the frequency of the first voltage V1 is set to be equal to a torsional resonance frequency of the first vibration system configured to include the movable portion 411 and the pair of first shaft portions 412a and 412b. Accordingly, the rotation angle of the movable portion 411 around the first axis J1 can be increased.

The second voltage generation portion 492 generates a second voltage V2 (a voltage for sub-scanning) that changes periodically with a period T2 different from the period T1, as shown in FIG. 8B. The second voltage V2 forms a sawtooth waveform. A frequency (1/T2) of the second voltage V2 may be different from the frequency (1/T1) of the first voltage V1, and is preferably, for example, 30 Hz to 120 Hz (about 60 Hz). In this embodiment, the frequency of the second voltage V2 is adjusted to be different from a torsional resonance frequency of the second vibration system configured to include the movable portion 411, the first shaft portions 412a and 412b, the frame body portion 413, the second shaft portions 414a and 414b, and the permanent magnet 46.

The frequency of the second voltage V2 is preferably less than the frequency of the first voltage V1. Accordingly, the movable portion 411 can be swung around the first axis J1 at the frequency of the first voltage V1 and can be swung around the second axis J2 at the frequency of the second voltage V2 more securely and smoothly.

In addition, when the torsional resonance frequency of the first vibration system is represented by f1 [Hz] and the torsional resonance frequency of the second vibration system is represented by f2 [Hz], f1 and f2 preferably satisfy a relationship of f2<f1, and more preferably a relationship of 10f2≤f1. Accordingly, the movable portion 411 can be more smoothly rotated around the first axis J1 at the frequency of the first voltage V1 and around the second axis J2 at the frequency of the second voltage V2. In the case of f1≤f2, the first vibration system may vibrate due to the frequency of the second voltage V2.

Each of the first voltage generation portion 491 and the second voltage generation portion 492 is connected to the control portion 6 and is driven based on a signal from the control portion 6. The voltage superimposition portion 493 is connected to the first voltage generation portion 491 and the second voltage generation portion 492.

The voltage superimposition portion 493 is provided with an adder 493a for applying a voltage to the coil 47. The adder 493a receives a first voltage V1 from the first voltage generation portion 491 and receives a second voltage V2 from the second voltage generation portion 492 to superimpose and apply the voltages to the coil 47.

Next, a method of driving the optical scanner 4 will be described. The frequency of the first voltage V1 is set to be equal to the torsional resonance frequency of the first vibration system, and the frequency of the second voltage V2 is set to be different from the torsional resonance frequency of the second vibration system and be less than the frequency of the first voltage V1 (for example, the frequency of the first voltage V1 is set to 18 kHz and the frequency of the second voltage V2 is set to 60 Hz).

For example, the first voltage V1 shown in FIG. 8A and the second voltage V2 shown in FIG. 8B are superimposed by the voltage superimposition portion 493, and the superimposed voltages are applied to the coil 47. As a result, by the first voltage V1, a magnetic field (this magnetic field is referred to as "magnetic field A1") that draws one end portion (N pole) of the permanent magnet 46 to the coil 47 and separates the other end portion (S pole) of the permanent magnet 46 from the coil 47, and a magnetic field (this magnetic field is referred to as "magnetic field A2") that separates one end portion (N pole) of the permanent magnet 46 from the coil 47 and draws the other end portion (S pole) of the permanent magnet 46 to the coil 47 are alternately switched.

When the magnetic fields A1 and A2 are alternately switched, a vibration having a torsional vibration component around the first axis J1 is excited to the frame body portion 413, and along with the vibration, the first shaft portions 412a and 412b are torsionally deformed and the movable portion 411 is swung around the first axis J1 at the frequency of the first voltage V1. Since the frequency of the first voltage V1 is equal to the torsional resonance frequency of the first vibration system, the movable portion 411 can be greatly swung by the resonant vibration.

Meanwhile, by the second voltage V2, a magnetic field (this magnetic field is referred to as "magnetic field B1") that draws one end portion (N pole) of the permanent magnet 46 to the coil 47 and separates the other end portion (S pole) of the permanent magnet 46 from the coil 47, and a magnetic field (this magnetic field is referred to as "magnetic field B2") that separates one end portion (N pole) of the permanent magnet 46 from the coil 47 and draws the other end portion (S pole) of the permanent magnet 46 to the coil 47 are alternately switched.

When the magnetic fields B1 and B2 are alternately switched, the frame body portion 413 is swung around the second axis J2 at the frequency of the second voltage V2 together with the movable portion 411 while the second shaft portions 414a and 414b are torsionally deformed. As described above, since the frequency of the second voltage V2 is set to be extremely lower than the frequency of the first voltage V1, and the torsional resonance frequency of the second vibration system is set to be lower than the torsional resonance frequency of the first vibration system, the movable portion 411 can be prevented from being rotated around the first axis J1 at the frequency of the second voltage V2.

As described above, in the optical scanner 4, by applying voltages obtained by superimposing the first voltage V1 and the second voltage V2 to the coil 47, the movable portion 411 can be rotated around the first axis J1 at the frequency of the first voltage V1 and around the second axis J2 at the frequency of the second voltage V2. Accordingly, the cost and the size of the device can be reduced. In addition, an electromagnetic drive method (a moving magnet method) is employed to securely swing the movable portion 411 around the first and second axes J1 and J2, and thus the drawing laser light LL reflected on the light reflection portion 411c can be two-dimensionally scanned. In addition, since the number of constituent components (the permanent magnet and the coil) of the drive source can be reduced, a simple and small configuration can be provided. In addition, since the coil 47 is separated from the vibration system of the optical scanner 4, adverse effects of the heat generation of the coil 47 on the vibration system can be prevented.

The optical scanner 4 has been described in detail. According to the gimbal-type, two-dimensional-scanning optical scanner 4 shown in this embodiment, drawing laser light LL can be two-dimensionally scanned using one device, and thus the device can be reduced in size and the alignment is easily adjusted, compared with, for example, a configuration in which two one-dimensional scanning optical scanners are combined to two-dimensionally scan drawing laser light LL.

Control Portion

The control portion 6 has a function of controlling actuation of the drawing light source unit 2 and the optical scanner 4. Specifically, the control portion 6 swings the movable portion 411 around the first and second axes J1 and J2 by driving the optical scanner 4, and emits drawing laser light LL from the drawing light source unit 2 by synchronization with the swinging of the movable portion 411 that is detected from the detection elements 51 and 52. Based on image data transmitted from an external computer, the control portion 6 emits laser light beams RR, GG, and BB having a predetermined intensity from the laser light sources 21R, 21G, and 21B at a predetermined time to emit drawing laser light LL having a predetermined color and a predetermined intensity at a predetermined time. Accordingly, an image corresponding to the image data is displayed on the target object 10.

Second Embodiment

Next, a second embodiment of the image display device of the invention will be described.

Figure 9:
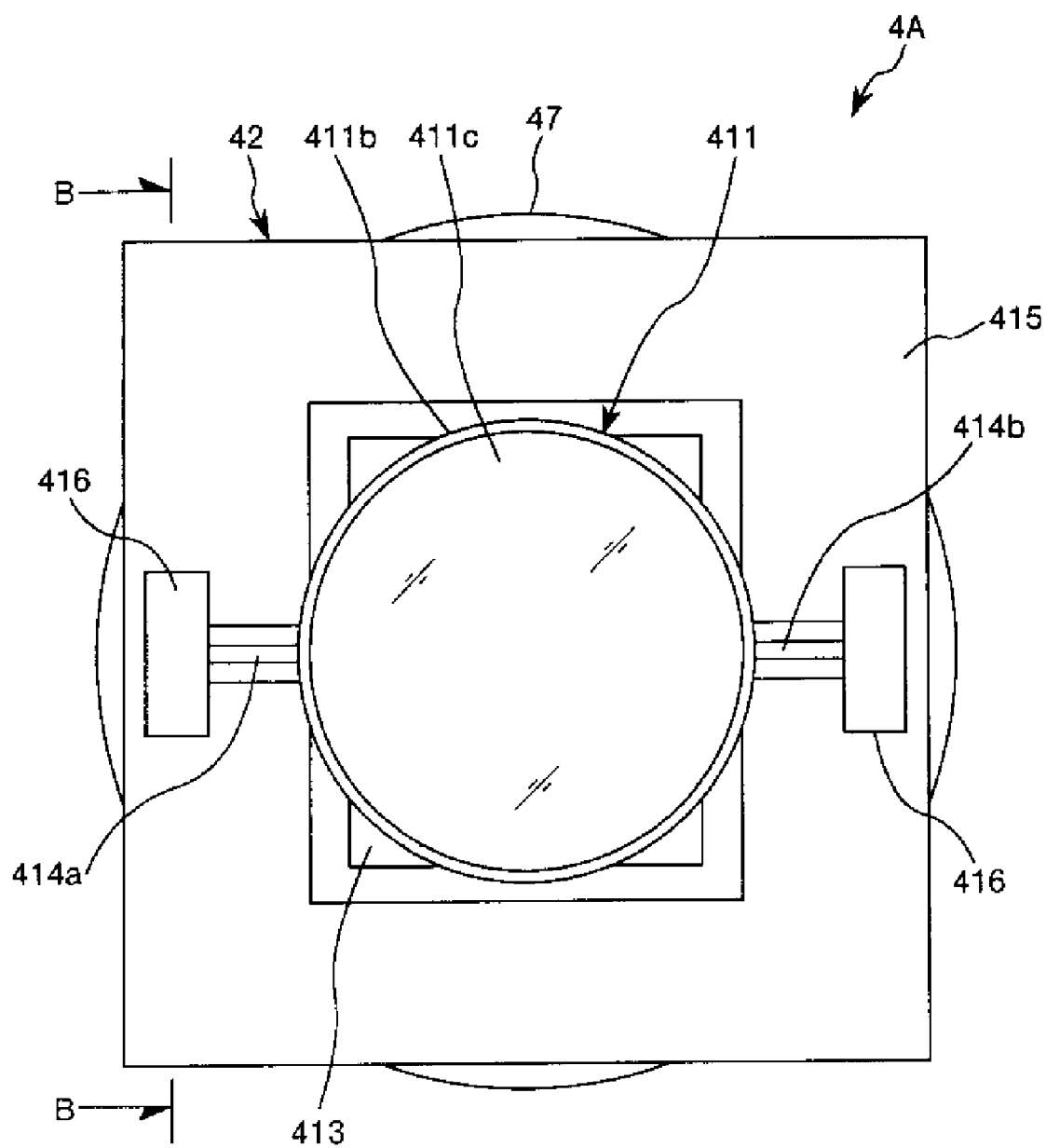
FIG. 9 is a top view of an optical scanner of an image display device according to a second embodiment of the invention.
Figure 10:
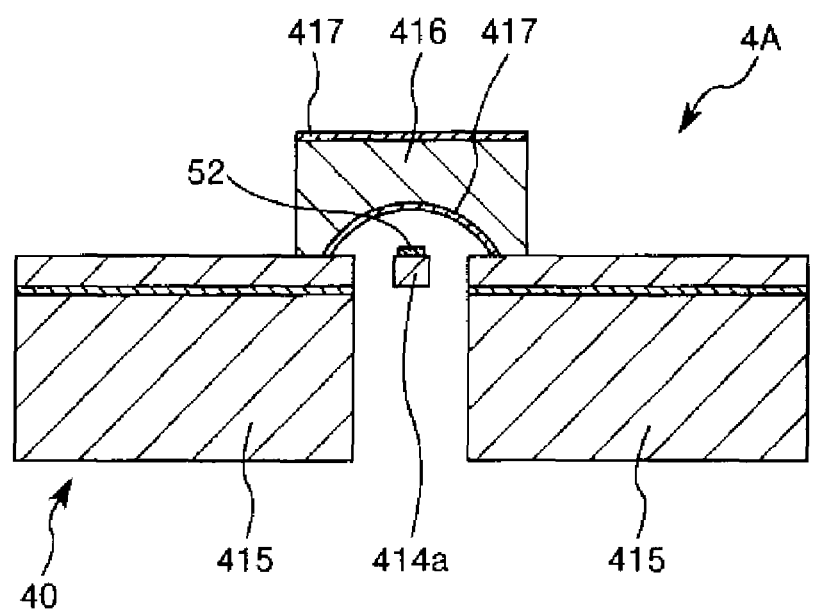
FIG. 10 is a cross-sectional view taken along the line B-B of FIG. 9.

FIG. 9 is a top view of an optical scanner of an image display device according to the second embodiment of the invention, and FIG. 10 is a cross-sectional view taken along the line B-B of FIG. 9.

Hereinafter, regarding the image display device of the second embodiment, differences from the above-described embodiment will be mainly described, and the description of the same items will be omitted.

The image display device according to the second embodiment of the invention is the same as that of the above-described first embodiment, except that the fixed portion of the optical scanner has a different configuration. The same configurations as in the above-described first embodiment will be denoted by the same reference symbols.

Optical Scanner

As shown in FIGS. 9 and 10, a fixed portion 416 of an optical scanner 4A of this embodiment is provided to overlap base end portions of second shaft portions 414a and 414b. A light blocking portion 417 is provided on a lower surface of the fixed portion 416, and thus the incidence of drawing laser light LL onto a detection element 52 is reduced.

According to the second embodiment, the same effects can be obtained as in the above-described first embodiment.

2. Optical Scanner Manufacturing Method

Next, a method of manufacturing the above-described optical scanner 4 will be described based on FIGS. 11A to 15B. FIGS. 11A to 15B are cross-sectional views corresponding to the cross-section shown in FIG. 5. The first shaft portions 412a and 412b and first shaft portion regions 412a' and 412b' will be omitted in FIGS. 11A to 15B because the cross-section is shown.

The method of manufacturing the optical scanner 4 has a bonding step of preparing the first substrate 42 and the second substrate 43 to bond the substrates to each other, a patterning step of patterning the first substrate 42, a thickness reduction step of cutting the second substrate 43 to reduce it in thickness, and a light reflection portion formation step of forming the light reflection portion 411c. Hereinafter, the manufacturing method will be described in detail.

1. Bonding Step 1-1. First Substrate Preparation Step

Figure 11A:
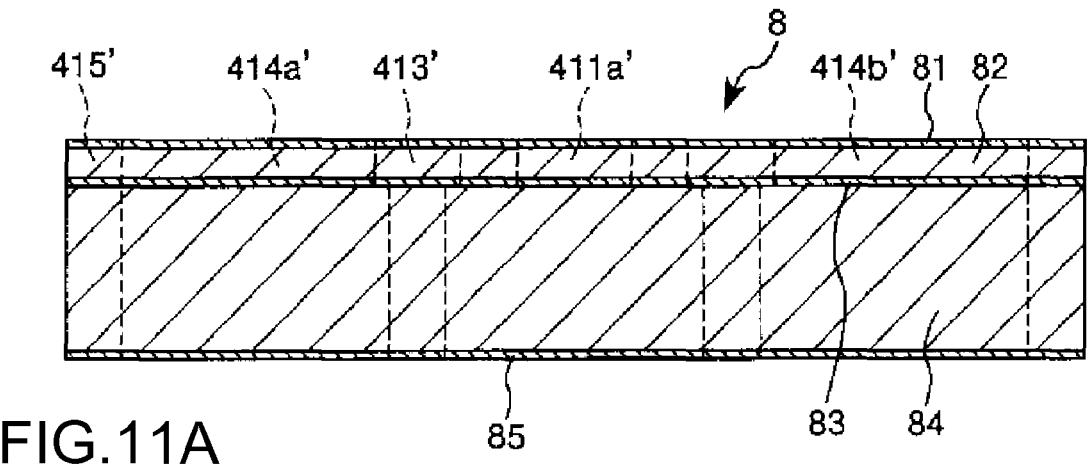
FIGS. 11A to 11C are diagrams for illustrating a method of manufacturing the optical scanner shown in FIG. 2.

First, as shown in FIG. 11A, a laminate substrate 8 is prepared in which a first $SiO_2$ layer 81, a first Si layer 82, a second $SiO_2$ layer 83, a second Si layer 84, and a third $SiO_2$ layer 85 are laminated from the upper side. The thicknesses of the respective layers are not particularly limited. For example, the first $SiO_2$ layer 81 can be adjusted to about 0.5 μm, the first Si layer 82 can be adjusted to about 40 μm, the second $SiO_2$ layer 83 can be adjusted to about 0.5 μm, the second Si layer 84 can be adjusted to about 250 μm, and the third $SiO_2$ layer 85 can be adjusted to about 1.6 μm.

The laminate substrate 8 has a base portion region 411a' that becomes the base portion 411a, first shaft portion regions 412a' and 412b' that become the first shaft portions 412a and 412b, a frame body portion region 413' that becomes the frame body portion 413, second shaft portion regions 414a' and 414b' that become the second shaft portions 414a and 414b, and a support portion region 415' that becomes the support portion 415 through the next patterning step.

Next, the first Si layer 82 is patterned through various etching processes (dry etching or wet etching) so that the base portion 411a, the first shaft portions 412a and 412b, apart of the frame body portion 413, the second shaft portions 414a and 414b, and a part of the support portion 415 are formed integrally with the first Si layer 82.

Figure 11B:
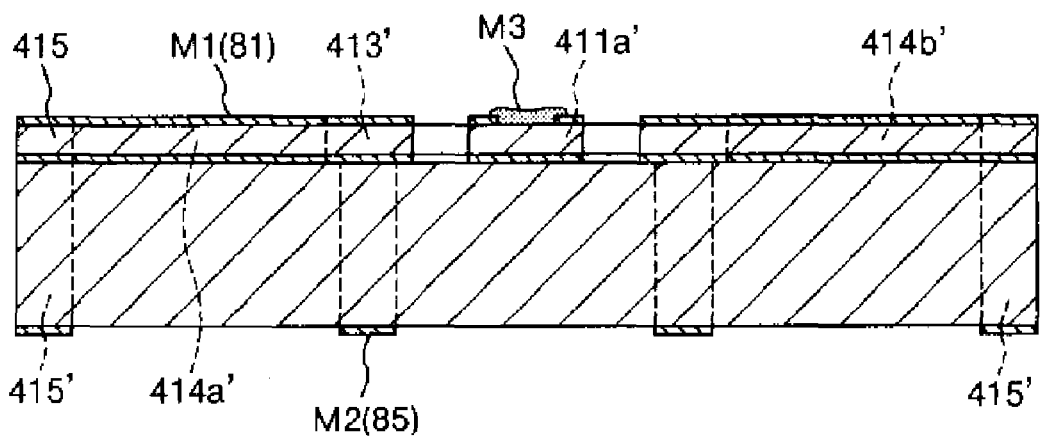
Figure 11C:
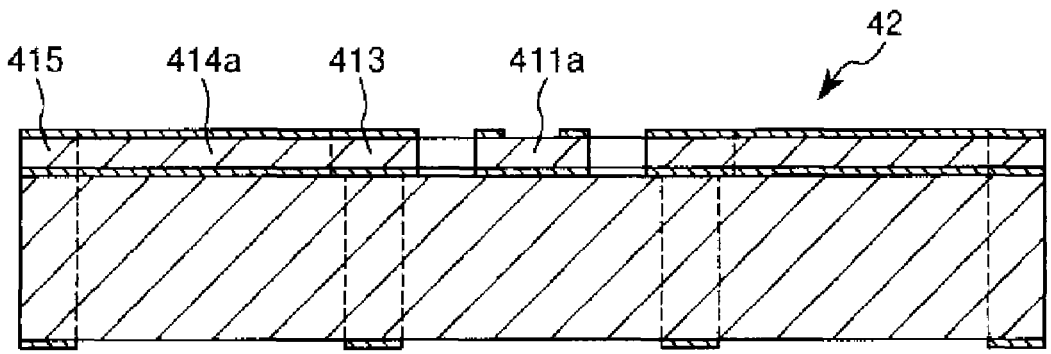

Specifically, first, as shown in FIG. 11B, the first and third $SiO_2$ layers 81 and 85 are patterned to form $SiO_2$ masks M1 and M2 corresponding to the base portion region 411a', the first shaft portion regions 412a' and 412b', the frame body portion region 413', the second shaft portion regions 414a' and 414b', and the support portion region 415'. At this time, the $SiO_2$ mask M1 is not formed in a region that is bonded to the spacer 411b of the base portion 411a and a region that is bonded to the fixed portion 416 of the support portion 415, and in place of this, a resist mask M3 is formed to prevent the exposure of the first Si layer 82. Next, the first Si layer 82 is etched via the $SiO_2$ mask M1 so that the base portion 411a, the first shaft portions 412a and 412b, a part of the frame body portion 413, the second shaft portions 414a and 414b, and a part of the support portion 415 are formed integrally with the first Si layer 82. Next, the $SiO_2$ mask M1 and the second $SiO_2$ layer 83 exposed from the first Si layer 82 are removed. Finally, the resist mask M3 is removed and the detection elements 51 and 52 (not shown) are formed to obtain the first substrate 42 as shown in FIG. 11C. The formation of the detection elements 51 and 52 may be performed in advance in the step of FIG. 11A.

1-2. Second Substrate Preparation Step

Figure 12A:
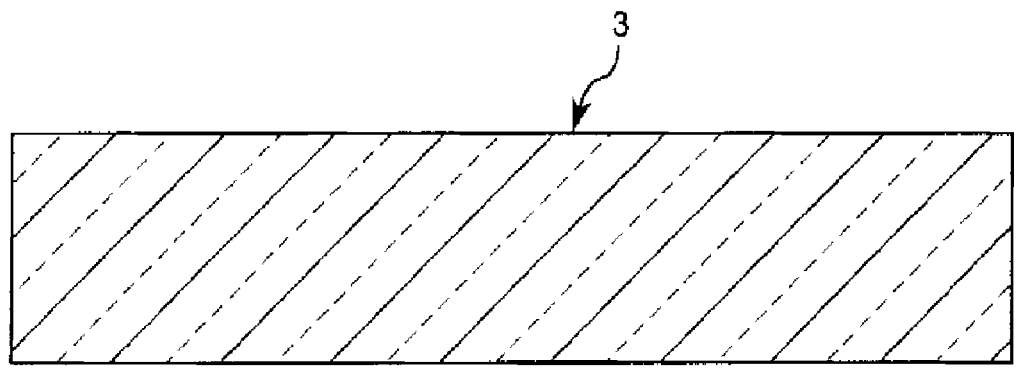
FIGS. 12A to 12C are diagrams for illustrating the method of manufacturing the optical scanner shown in FIG. 2.
Figure 12B:
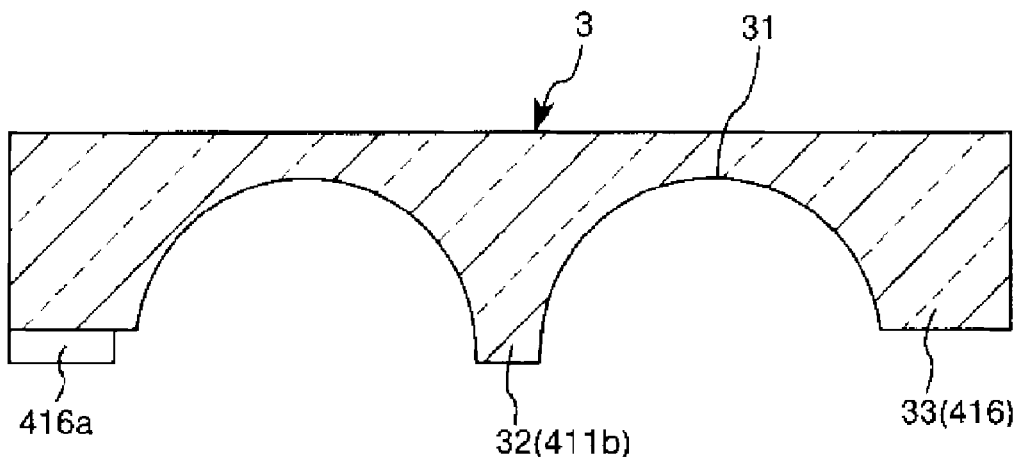
Figure 12C:
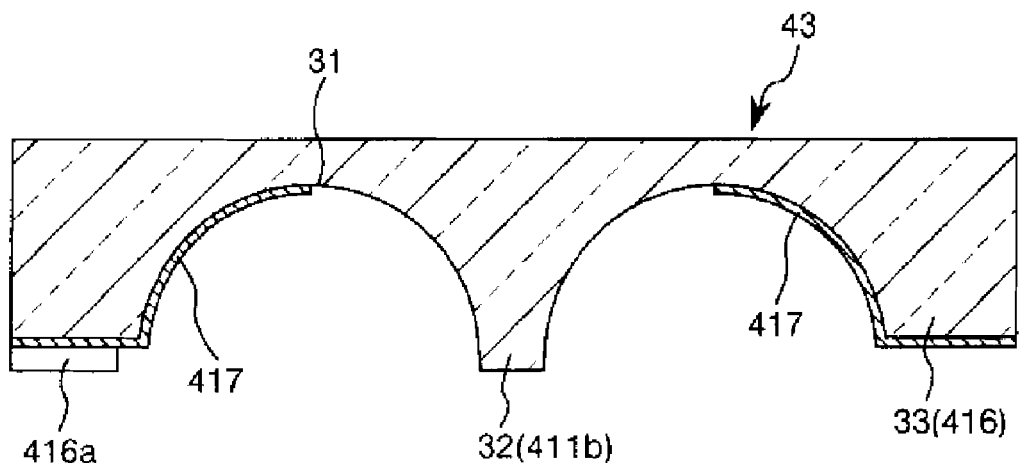

First, a substantially colorless, transparent glass substrate (for example, a Tempax glass substrate) 3 is prepared as shown in FIG. 12A. The thickness of the glass substrate 3 is not particularly limited, and can be adjusted to, for example, about 400 μm. Next, as shown in FIG. 12B, a lower surface of the glass substrate 3 is patterned through, for example, wet etching to form a toric concave portion 31, a first convex portion (a first portion) 32 that is provided inside the concave portion 31 and constitutes the spacer 411b, and a second convex portion (a second portion) 33 that is provided outside the concave portion 31 and constitutes the fixed portion 416. At this time, an inner surface of the concave portion 31 is made concave to include a curved surface. The glass substrate 3 is also preferred in view of the fact that processing for making the inner surface of the concave portion 31 concave to include a curved surface can be easily performed.

Next, for example, through deposition, sputtering, or the like, a Cr film is formed on the lower surface of the glass substrate 3 (excluding the protruding portion 416a) and on a region on the outer peripheral side of the inner surface of the concave portion 31 to form a part of the light blocking portion 417. Accordingly, the second convex portion 33 having a light blocking function and a light reflectance reduction function is obtained. As a result, the second substrate 43 is obtained.

1-3. Bonding Step

Figure 13A:
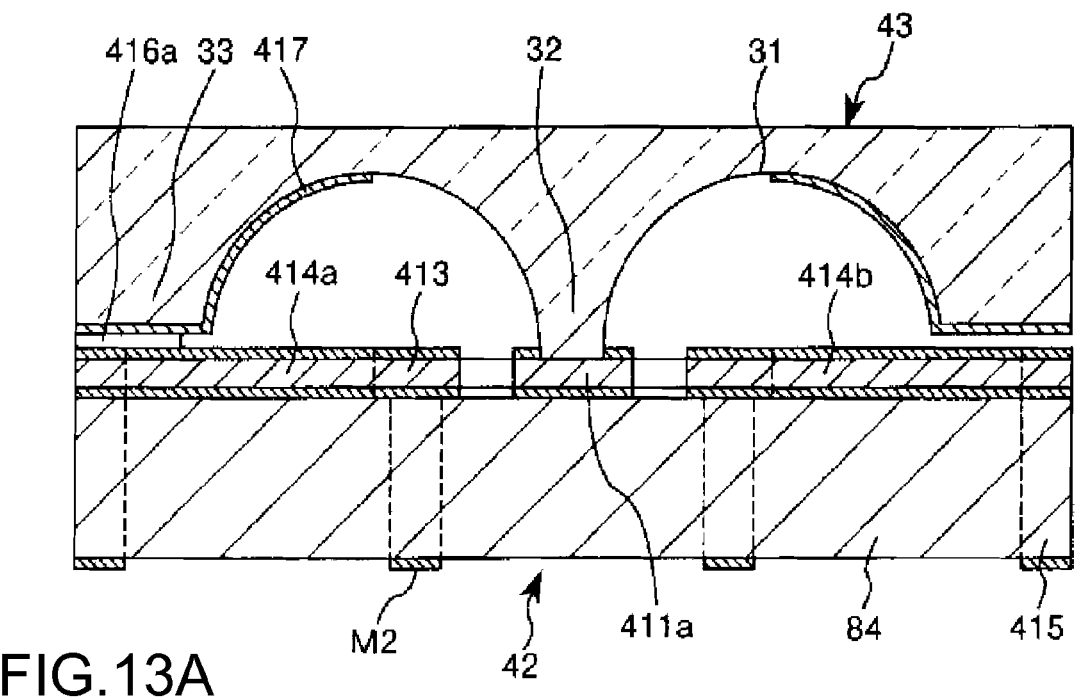
FIGS. 13A and 13B are diagrams for illustrating the method of manufacturing the optical scanner shown in FIG. 2.

First, as shown in FIG. 13A, the first substrate 42 obtained in the step [1-1] and the second substrate 43 obtained in the step [1-2] overlap one another to bond the base portion 411a to the first convex portion 32 and to bond the support portion 415 to the second convex portion 33. The bonding method is not particularly limited, and anodic bonding is preferably used. Accordingly, the first and second substrates 42 and 43 can be bonded to each other with a higher strength. As described above, the first $SiO_2$ layer 81 is not formed in the region where the base portion 411a is bonded to the first convex portion 32 and in the region where the support portion 415 is bonded to the second convex portion 33, and thus the first Si layer 82 is exposed. Thus, the anodic bonding can be securely performed.

2. Patterning Step

Figure 13B:
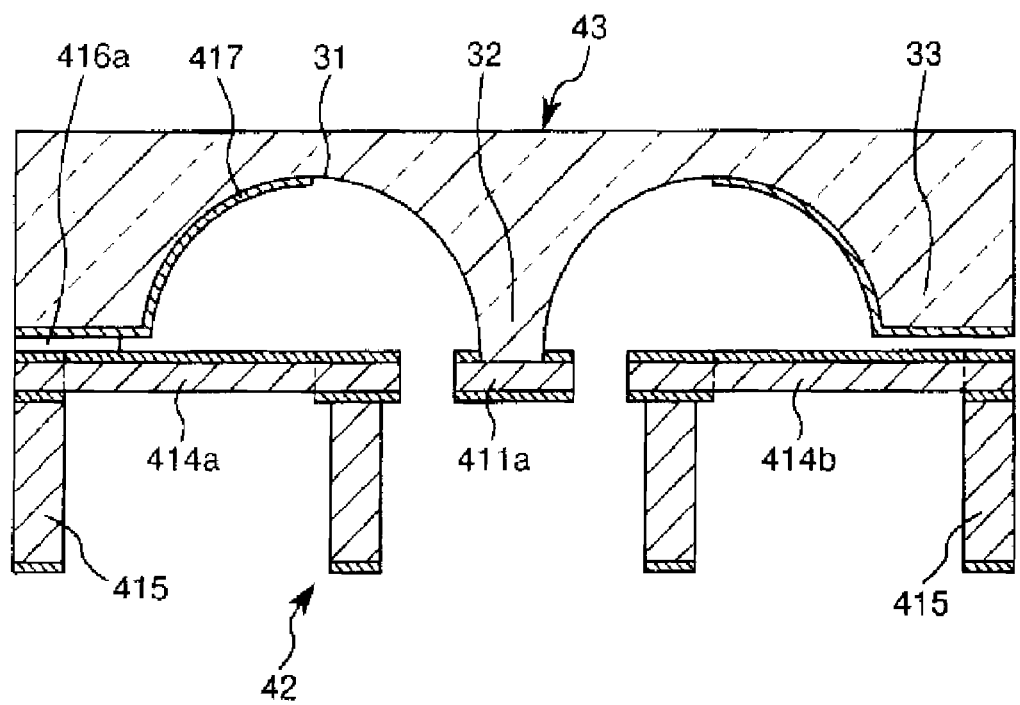

Next, the second Si layer 84 is patterned via the $SiO_2$ mask M2 through, for example, dry etching to form a part (the rib portion) of the frame body portion 413 and a part of the support portion 415. Next, the $SiO_2$ mask M2 and the second SiO₂ layer 83 exposed from the second Si layer 84 are removed. Accordingly, as shown in FIG. 13B, the base portion 411a, the first shaft portions 412a and 412b, the frame body portion 413, the second shaft portions 414a and 414b, and the support portion 415 are formed integrally with each other from the first substrate 42.

3. Filling Step

Figure 14A:
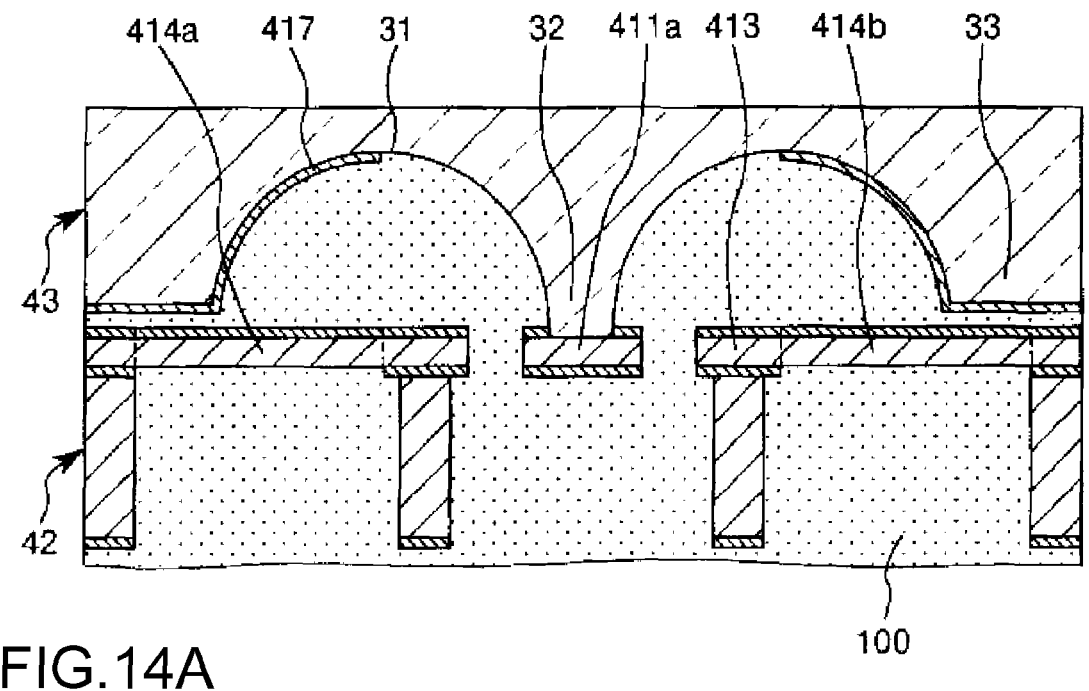
FIGS. 14A and 14B are diagrams for illustrating the method of manufacturing the optical scanner shown in FIG. 2.

Next, as shown in FIG. 14A, a seal material 100 such as wax is supplied from the gap formed in the first substrate 42 to fill the gap (the space) between the first and second substrates 42 and 43 with the seal material 100. The seal material 100 has a function of increasing the strengths of the first and second substrates 42 and 43 and a function of preventing etching damage that occurs on the first substrate 42 in the thickness reduction step to be described later.

4. Thickness Reduction Step

Figure 14B:
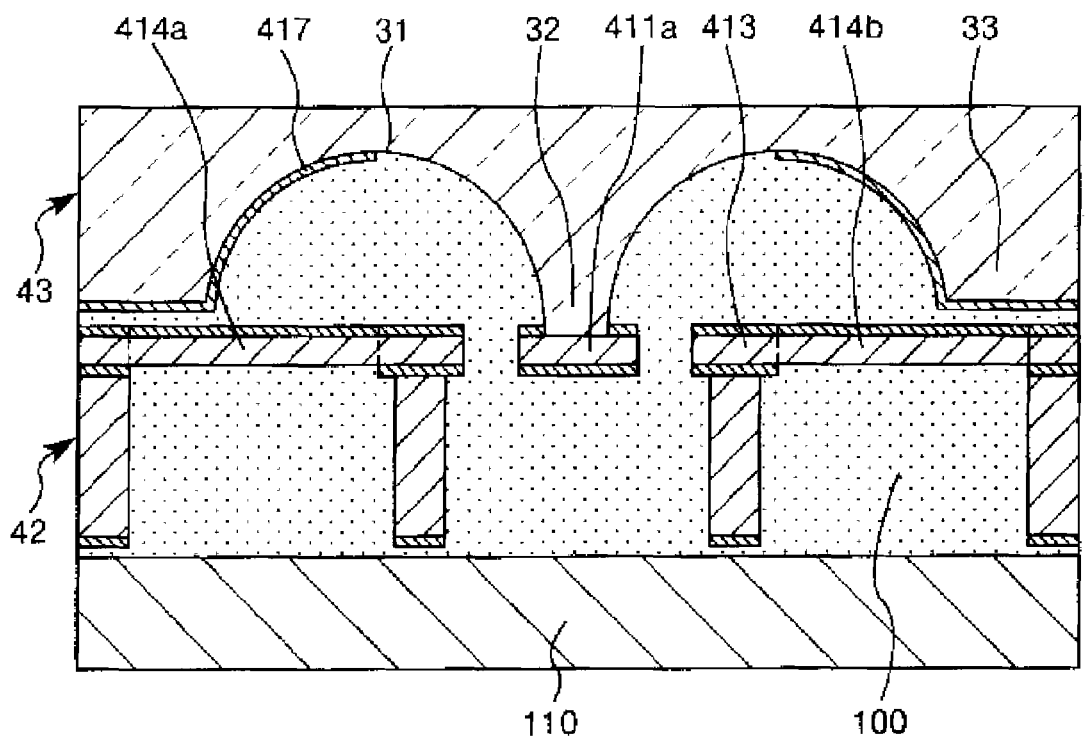
Figure 15A:
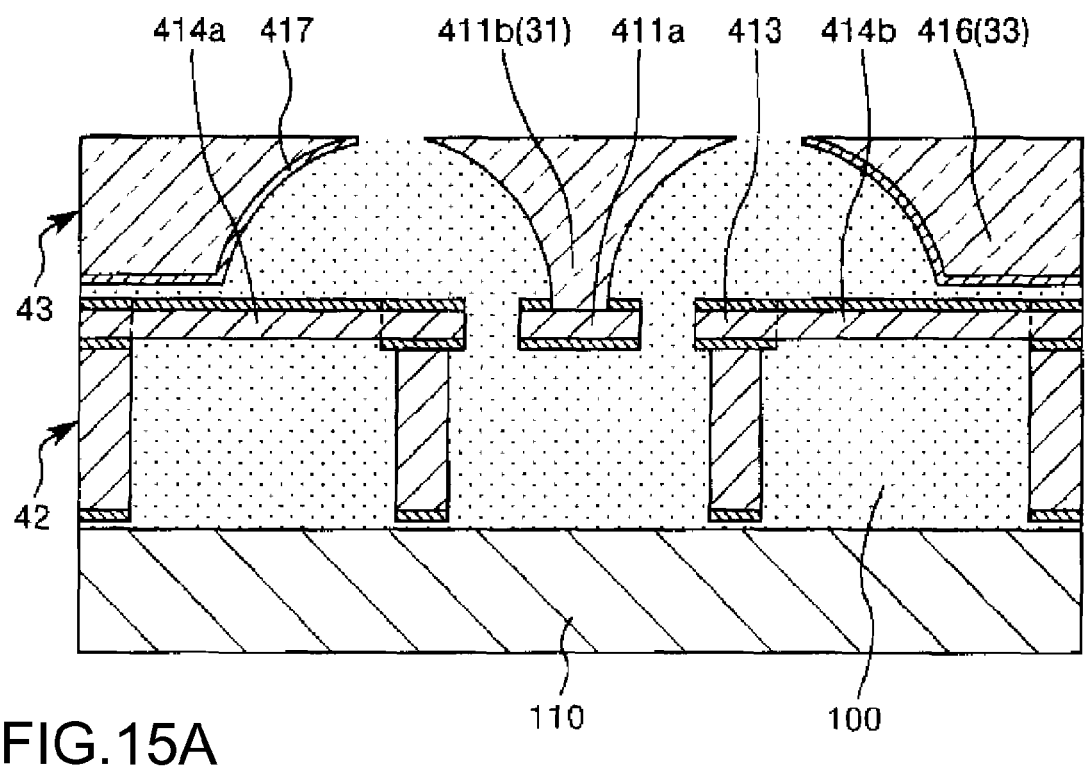
FIGS. 15A and 15B are diagrams for illustrating the method of manufacturing the optical scanner shown in FIG. 2.

Next, as shown in FIG. 14B, the laminate of the first and second substrates 42 and 43 is fixed to a support substrate 110 so that the first substrate 42 is on the lower side. The seal material 100 is used for the fixing. Next, as shown in FIG. 15A, the second substrate 43 is cut through, for example, wet etching from the upper surface side so as to be reduced in thickness. Accordingly, the portion other than the first and second convex portions 32 and 33 is removed, the concave portion 31 penetrates the upper surface, and the first convex portion 32 and the second convex portion 33 are separated from each other. Accordingly, the spacer 411b and the fixed portion 416 are obtained. Here, since the first substrate 42 is protected with the seal material 100, the etching liquid does not come into contact with the first substrate 42 in this step, and thus damage on the first substrate 42 can be prevented. The method of reducing the second substrate 43 in thickness is not limited to wet etching, and for example, abrading may be employed. Also, in the case of abrading, the seal material 100 is used in the protection, and thus the breakage of the structural body during the abrading can be prevented.

5. Light Reflection Layer Formation Step

Figure 15B:
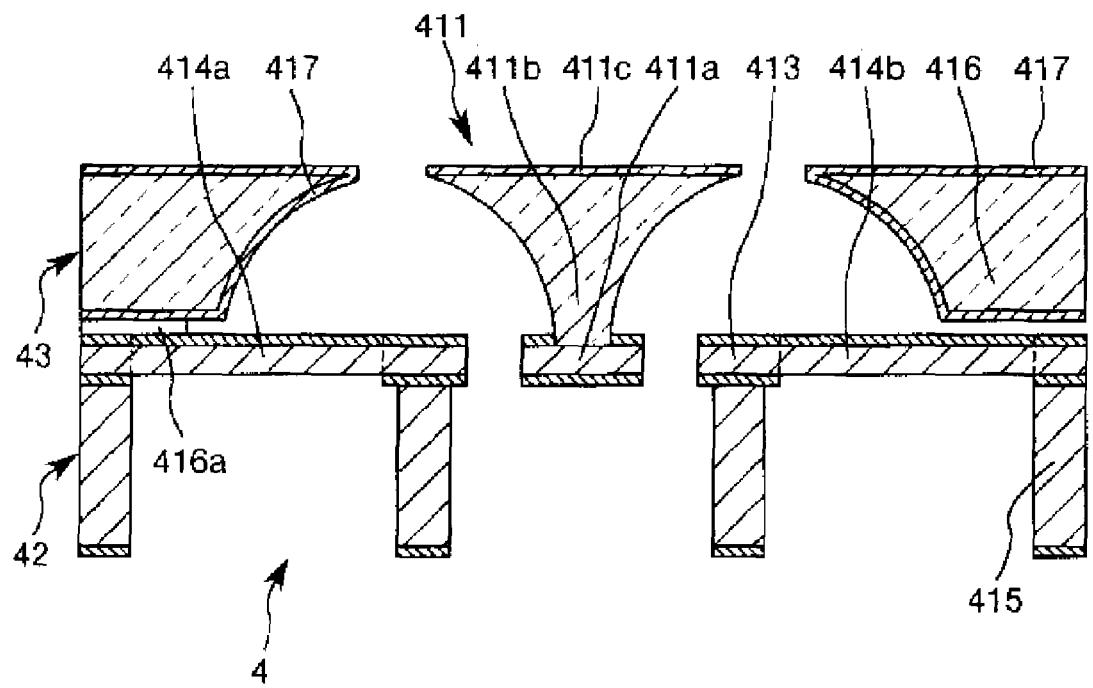

Next, the seal material 100 is removed using a solvent such as acetone, and then an aluminum film is formed through, for example, deposition, sputtering, or the like on the upper surface of the spacer 411b to form the light reflection portion 411c. In addition, a Cr film is formed on the upper surface of the fixed portion 416 through deposition, sputtering, or the like to form the light blocking portion 417. Accordingly, the optical scanner 4 is obtained as shown in FIG. 15B.

According to the optical scanner manufacturing method, since both the fixed portion 416 and the spacer 411b are formed from the second substrate 43, positional deviation between the fixed portion 416 and the spacer 411b during the manufacturing does not occur, and thus the alignment of the fixed portion 416 and the spacer 411b can be controlled with high accuracy.

3. Head-Up Display

Next, a head-up display as an example of the image display device of the invention will be described.

Figure 16:
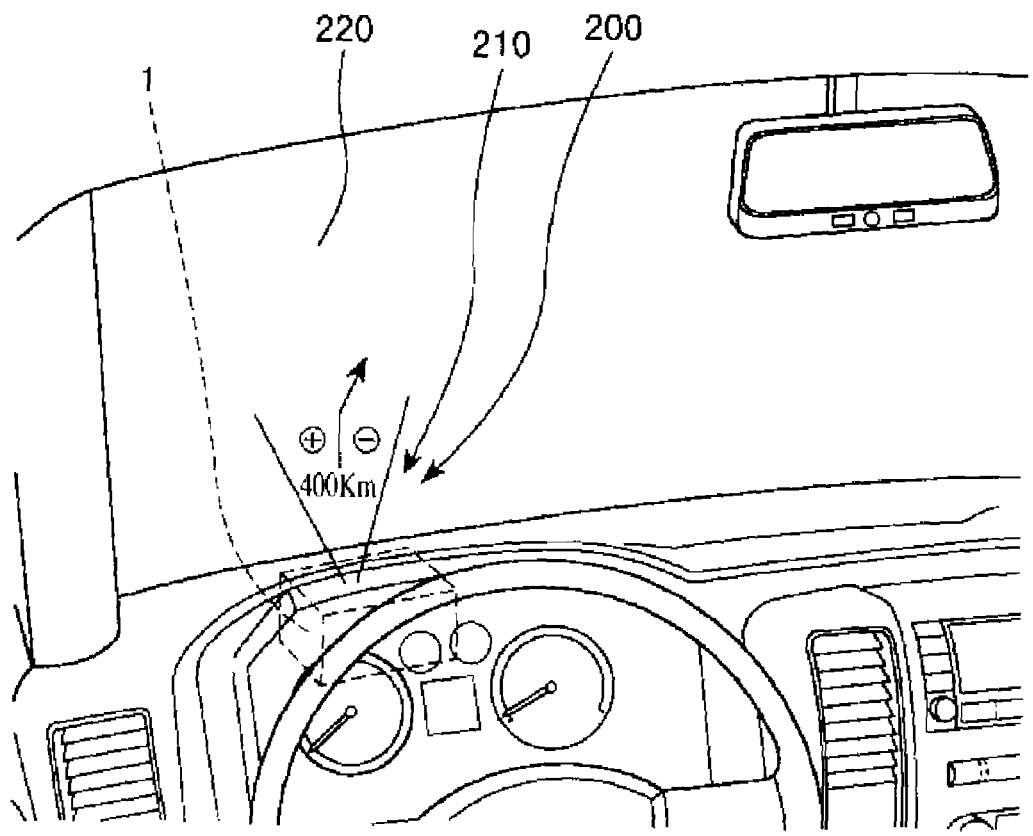
FIG. 16 is a perspective view showing a head-up display applying the image display device according to the invention.

FIG. 16 is a perspective view showing a head-up display applying the image display device according to the invention.

As shown in FIG. 16, in a head-up display system 200, the image display device 1 is built in a dashboard of a vehicle to configure a head-up display 210. The head-up display 210 can display a predetermined image such as guide display up to a destination on a windshield 220. The head-up display system 200 can be applied not only to vehicles, but also to, for example, airplanes and ships.

4. Head-Mounted Display

Next, a head-mounted display according to the invention will be described.

Figure 17:
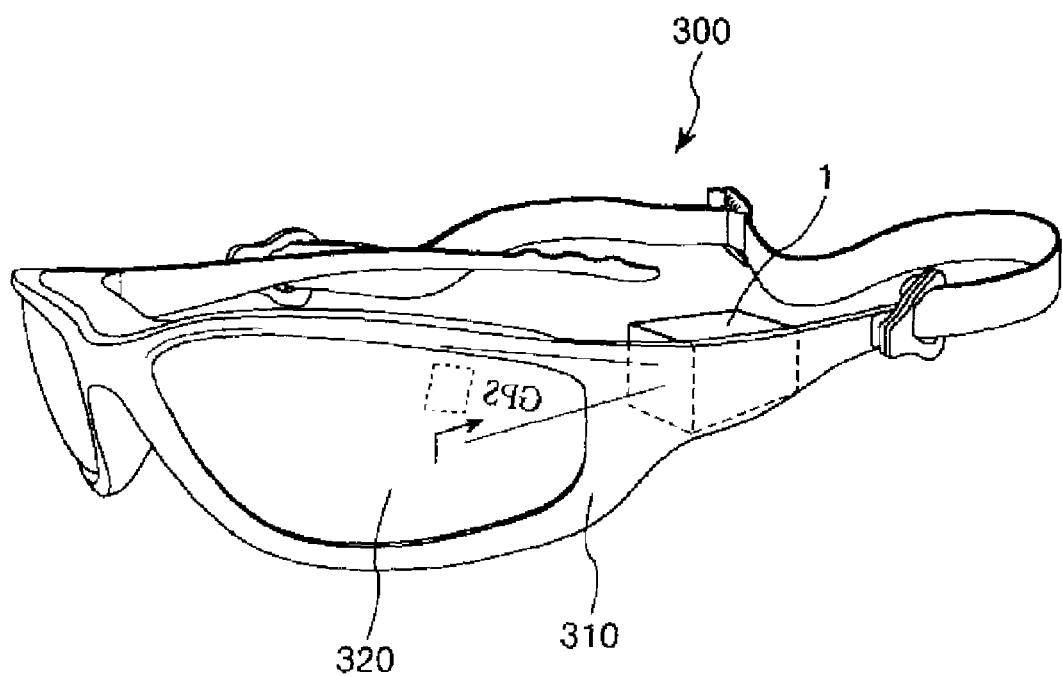
FIG. 17 is a perspective view showing a head-mounted display according to the invention.

FIG. 17 is a perspective view showing the head-mounted display according to the invention.

As shown in FIG. 17, a head-mounted display 300 has a frame 310 that is mounted on an observer's head and the image display device 1 that is built in the frame 310. The image display device 1 displays a predetermined image that is recognized with one eye on a display portion (a light reflection layer member) 320 provided in a portion corresponding to the original lens of the frame 310.

The display portion 320 may be transparent or opaque. When the display portion 320 is transparent, information from the image display device 1 may be used in an overlapping manner on information from the real world. The display portion 320 may reflect at least a part of incident light, and can use, for example, a half mirror or the like.

The head-mounted display 300 may be provided with two image display devices 1 to display images that are recognized with both eyes on two display portions.

Although the optical scanner manufacturing method, the optical scanner, the image display device, and the head-mounted display according to the invention have been described based on the embodiments shown in the drawings, the invention is not limited thereto. The configurations of the portions can be substituted by arbitrary configurations having the same functions. In addition, other arbitrary configurations may be added to the invention.

In addition, in the above-described embodiments, one optical scanner capable of two-dimensionally scanning drawing laser light is used as the optical scanner. However, two optical scanners (the optical scanner according to the invention) capable of performing one-dimensional scanning may be prepared and disposed so that swing axes thereof are perpendicular to each other. Drawing laser light can be two-dimensionally scanned with such a configuration.

In addition, in the above-described embodiments, an electromagnetic drive method using a coil and a permanent magnet is employed as the drive method of the optical scanner, but the drive method is not limited thereto. For example, a piezoelectric drive method in which a piezoelectric element (a piezo element) is provided in each of first and second shaft portions to use the compression and expansion of the piezoelectric elements, thereby driving an optical scanner, or an electrostatic drive method using an electrostatic force may be employed. In addition, even when the electromagnetic drive method is used, the arrangement of the coil and the permanent magnet may be reversed. That is, the coil may be provided in the frame body portion and the permanent magnet may be disposed to be opposed to the coil.

The entire disclosure of Japanese Patent Application No. 2013-062318, filed Mar. 25, 2013 is expressly incorporated by reference herein.

What is claimed is:

1. An optical scanner manufacturing method comprising:
overlapping a first substrate including a base portion region that becomes a base portion, a shaft portion region that becomes a shaft portion swingably supporting the base portion, and a support portion region that becomes a support portion supporting the base portion via the shaft portion, and a second substrate in which a frame-like concave portion, a first portion that is positioned inside the concave portion, and a frame-like second portion that is positioned outside the concave portion and has a light reflectance reduction function are formed on one surface, to bond the base portion region to the first portion and to bond the support portion region to the second portion;

patterning the first substrate to form the base portion, the shaft portion, and the support portion; and cutting the second substrate from the other surface side to allow the concave portion to penetrate the other surface side to thus separate the first portion and the second portion from each other.

2. The optical scanner manufacturing method according to claim 1, further comprising:

forming a light reflection portion having reflectivity on a surface of the first portion on the opposite side to the first substrate after the cutting of the second substrate.

3. The optical scanner manufacturing method according to claim 1, further comprising:

filling a gap between the first substrate and the second substrate with a seal material before the cutting of the second substrate, wherein in the cutting of the second substrate, the second substrate is cut through wet etching.

4. The optical scanner manufacturing method according to claim 1, wherein a surface of the second portion is provided with a light reflection reduction portion that reduces light reflectance.

5. The optical scanner manufacturing method according to claim 1, wherein an inner surface of the concave portion is made concave to include a curved surface.

6. The optical scanner manufacturing method according to claim 1, wherein in the overlapping of the first substrate and the second substrate, the first substrate and the second substrate are bonded to each other through anodic bonding.

7. An optical scanner comprising:

a substrate that has a base portion, a shaft portion swingably supporting the base portion, and a support portion supporting the base portion via the shaft portion;

a spacer that is supported by the base portion;

a fixed portion that is fixed to the support portion, is provided around at least a part of an outer periphery of the spacer, and is made from the same material as the spacer; and a light reflection reduction portion that is provided on a surface of the fixed portion on the substrate side and reduces light reflectance.

8. The optical scanner according to claim 7, further comprising:

a light-reflective light reflection portion that is provided on a surface of the spacer on the opposite side to the substrate.

9. The optical scanner according to claim 7, wherein a surface of the spacer and a surface of the fixed portion on the opposite side to the substrate are positioned flush with each other.

10. The optical scanner according to claim 7, wherein the fixed portion overlaps at least a part of the shaft portion in plan view of the substrate, and wherein a torsion detection element that detects torsion of the shaft portion is provided in the region where the shaft portion and the fixed portion overlap each other.

11. An image display device comprising:

a substrate that has a base portion, a shaft portion swingably supporting the base portion, and a support portion supporting the base portion via the shaft portion;

a spacer that is supported by the base portion and has a light reflection portion that reflects light;

a fixed portion that is fixed to the support portion, is provided around at least a part of an outer periphery of the spacer, and is made from the same material as the spacer; and a light reflection reduction portion that is provided on a surface of the fixed portion on the substrate side and reduces light reflectance.

12. A head-mounted display comprising:

a frame that is mounted on an observer's head; and an optical scanner that is provided in the frame, wherein the optical scanner includes a substrate that has a base portion, a shaft portion swingably supporting the base portion, and a support portion supporting the base portion via the shaft portion;

a spacer that is supported by the base portion and has a light reflection portion that reflects light;

a fixed portion that is fixed to the support portion, is provided around at least a part of an outer periphery of the spacer, and is made from the same material as the spacer; and a light reflection reduction portion that is provided on a surface of the fixed portion on the substrate side and reduces light reflectance.

* * * * *